(12) United States Patent
Perrelli et al.

(10) Patent No.: US 12,546,339 B1
(45) Date of Patent: Feb. 10, 2026

(54) ACTUATOR LOAD AND SLEW RATE LIMITING VIA PRESSURE THROTTLING SHUTOFF VALVE

(71) Applicant: Hamilton Sundstrand Corporation, Charlotte, NC (US)

(72) Inventors: Frank Perrelli, East Haven, CT (US); Sachin Ramprashad, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/890,698

(22) Filed: Sep. 19, 2024

(51) Int. Cl.
*F15B 13/04* (2006.01)
*F15B 11/028* (2006.01)
*F15B 20/00* (2006.01)
*F16K 17/18* (2006.01)

(52) U.S. Cl.
CPC ........ *F15B 11/028* (2013.01); *F15B 13/0402* (2013.01); *F15B 13/0416* (2013.01); *F15B 20/007* (2013.01); *F16K 17/18* (2013.01)

(58) Field of Classification Search
CPC ...... F15B 11/003; F15B 13/01; F15B 13/023; F15B 13/0402; F15B 13/0416; F15B 13/042; F15B 20/00; F15B 20/007; F16K 17/18
See application file for complete search history.

(56) References Cited

U.S. PATENT DOCUMENTS

| | | | | |
|---|---|---|---|---|
| 2,362,349 A * | 11/1944 | Bryant | ................... | F16K 17/18 91/438 |
| 6,981,439 B2 | 1/2006 | Hart | | |
| 8,671,986 B2 * | 3/2014 | Tanino | ................... | E02F 9/226 137/625.69 |
| 10,538,310 B2 | 1/2020 | Polcuch | | |
| 11,635,097 B1 | 4/2023 | O'Rorke et al. | | |
| 11,821,443 B2 | 11/2023 | Potier | | |
| 11,906,986 B2 | 2/2024 | Bari et al. | | |
| 12,392,361 B1 * | 8/2025 | Ramprashad | ........... | F16K 11/07 |

* cited by examiner

*Primary Examiner* — Michael Leslie
(74) *Attorney, Agent, or Firm* — Kinney & Lange, P.A.

(57) ABSTRACT

A system includes a control valve with a first control port and a second control port. An actuator of the system includes a piston between an extend chamber and a retract chamber. The system also includes a shutoff valve fluidically connected between the control valve and the actuator. The shutoff valve is passively controlled by a pressure differential between the extend chamber and the retract chamber. If the pressure differential between the extend chamber and the retract chamber exceeds normal operating pressures for the actuator, the shutoff valve closes to stop pressure and flow communication between the control valve and the actuator, thereby pausing the actuator. When the pressure differential between the extend chamber and the retract chamber returns to the normal operating pressures for the actuator, the shutoff valve passively returns to an equilibrium position that allows the actuator to resume operation.

20 Claims, 10 Drawing Sheets

ACTUATOR LOAD AND SLEW RATE LIMITING VIA PRESSURE THROTTLING SHUTOFF VALVE

BACKGROUND

A linear hydraulic actuator can be used to position a kinematic device, sometimes via an intermediate linking mechanism. A linear hydraulic actuator typically has a bilaterally moveable piston within a hydraulic cylinder. Hydraulic chambers are positioned on both sides of the bilaterally moveable piston and are typically filled with hydraulic fluid. A pressure differential between the two hydraulic chambers generates a force that can move the bilaterally moveable piston, which can then position the kinematic device coupled thereto. The displacement of the bilaterally moveable piston is in the direction of a central axis of the hydraulic piston. Because hydraulic fluids are typically incompressible (or nearly so), a hydraulic controller of the linear hydraulic actuator can provide precise linear displacement of the bilaterally moveable piston.

Hydraulic systems are used to manipulate or operate various kinematic devices in aircraft, especially larger aircraft. Such kinematic devices, which can be hydraulically manipulated or operated, can include moveable airfoil surfaces, landing gear deployment and retraction mechanisms, turbofan engine control devices (such as variable guide vanes that can be rotationally oriented by linear hydraulic actuators), etc. In some scenarios, such kinematic devices can become difficult to operate. For example, in icing conditions, various flight control surfaces can become frozen, making them inoperable. In another example, Foreign Object Debris (FOD) can be ingested into a turbofan engine, causing damage to variable guide vanes. When such kinematic devices are damaged or worn, they can experience binding or higher than normal friction, or they can even become inoperable. Such increased friction and binding can sometimes be overcome with greater than the normal load to the linear hydraulic actuator. If the load to the linear hydraulic actuator exceeds the sizing limit of the linear hydraulic actuator, operation of the stalled kinematic device can cause damage to the kinematic device, any linking mechanism, the linear hydraulic actuator, or the mounting structure of any of these components. When the compromised kinematic devices can be operated only by loads in excess of such a sizing limit of the linear hydraulic actuator, the linear hydraulic actuator can be referred to as a stalled actuator.

A traditional system for preventing damage to the kinematic device, any linking mechanism, the linear hydraulic actuator, or the mounting of any of these components, may include methods of physically disconnecting the linear hydraulic actuator from the kinematic device if the load output is high enough to cause such damage. For example, a linking mechanism can include a shear pin sized to sheer in response to the load of the linear hydraulic actuator exceeding a predetermined threshold. Use of such a sacrificial part, such as the sheer pin, can result in the kinematic device becoming inoperable following such a sheering event, even when the cause for the stalled actuator is temporary, such as in the case of icing on the variable guide vane.

SUMMARY

In one example of the disclosure, an actuation system includes an electrohydraulic servo valve with a first control port and a second control port. The system also includes a hydraulic actuator with an actuator housing, a piston inside the actuator housing, an extend chamber in the actuator housing on a first side of the piston, a retract chamber in the actuator housing on a second side of the piston, and a linkage arm extending from the piston through the actuator housing. The system also includes a shutoff valve. The shutoff valve includes a valve housing extending axially from a first end of the shutoff valve to a second end of the shutoff valve relative to a center axis of the shutoff valve. A first valve seat is formed in the valve housing and is axially between the first end and the second end of the shutoff valve. A first port extends through the valve housing and is axially between the first end of the shutoff valve and the first valve seat. The first port is fluidically connected to the extend chamber of the hydraulic actuator. A second port extends through the valve housing and is axially between the first valve seat and the second end of the shutoff valve. The second port is fluidically connected to the first control port. A third port extends through the valve housing and is axially between the second port and the second end of the shutoff valve. The third port is fluidically connected to the second control port or the retract chamber of the hydraulic actuator. A spool is inside the valve housing and includes a land in the valve housing that is axially between the first valve seat and the second end of the shutoff valve. A first spring is between the spool and the valve housing. The first spring biases the land to an equilibrium position between the second port and the third port.

In another example of the disclosure, a shutoff valve includes a valve housing extending axially from a first end of the shutoff valve to a second end of the shutoff valve relative to a center axis of the shutoff valve. A first valve seat is formed in the valve housing and is axially between the first end and the second end of the shutoff valve. A first port extends through the valve housing and is axially between the first end of the shutoff valve and the first valve seat. A second port extends through the valve housing and is axially between the first valve seat and the second end of the shutoff valve. A third port extends through the valve housing and is axially between the second port and the second end of the shutoff valve. A spool is inside the valve housing and includes a land in the valve housing. The land is axially between the first valve seat and the second end of the shutoff valve. A first spring is between the spool and the valve housing. The first spring biases the land to an equilibrium position between the second port and the third port.

In another example of the disclosure an actuation system includes an electrohydraulic servo valve, a hydraulic actuator, and a shutoff valve. The electrohydraulic servo valve includes a first control port and a second control port. The hydraulic actuator includes an actuator housing and a piston inside the actuator housing. An extend chamber is in the actuator housing on a first side of the piston. A retract chamber is in the actuator housing on a second side of the piston. A linkage arm extends from the piston through the actuator housing. A shutoff valve fluidically connects the first control port to the extend chamber and/or fluidically connects the second control port to the retract chamber. The shutoff valve includes a valve housing and a spool in the valve housing. At least one spring biases the spool to an equilibrium position that permits fluid and pressure transfer between the electrohydraulic servo valve and the hydraulic actuator. The shutoff valve also includes a valve seat that contacts the spool to close fluid and pressure transfer between the electrohydraulic servo valve and the hydraulic actuator when the spool moves out of the equilibrium position.

DETAILED DESCRIPTION

Apparatus and associated methods relate to passively limiting a load of a stalled actuator that actuates a kinematic device. A shutoff valve is connected between a hydraulic actuator and a controller of the hydraulic actuator. The hydraulic actuator can be connected to a kinematic device such that the controller can actuate the hydraulic actuator to power the kinematic device. During regular operation of the hydraulic actuator and the controller, the shutoff valve is in an equilibrium position that allows flow and pressure to be passed between the controller and the hydraulic actuator. In the event that the kinematic device binds or seizes, the pressure shutoff valve can stop pressure and flow communication between the controller and the hydraulic actuator to prevent the hydraulic actuator from damaging itself, from damaging the kinematic device, from damaging any associated mounting structure(s), and/or from damaging any associated linking mechanism(s). Should the binding or seizing of the kinematic device become resolved, the shutoff valve can move back to the equilibrium position to restore regular flow and function between the controller and the hydraulic actuator.

Figure 1:
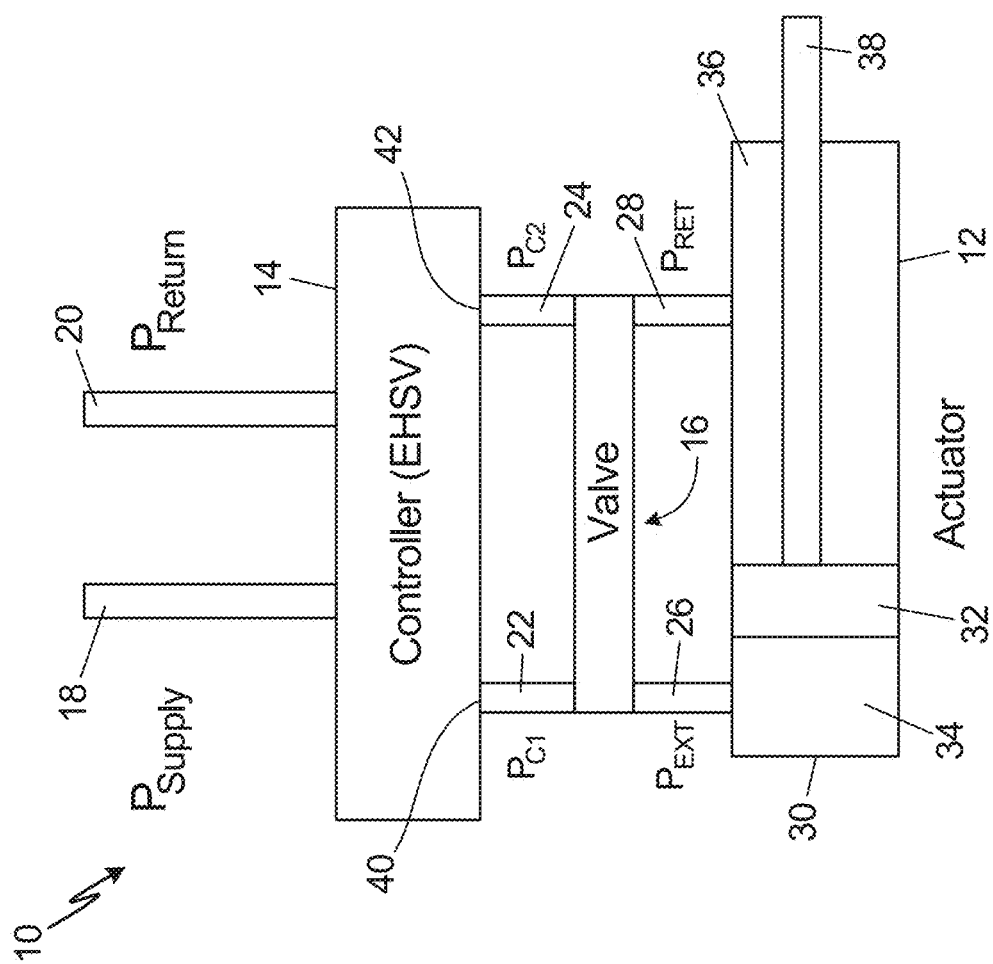
FIG. 1 is a schematic diagram of a hydraulic actuator system with a controller, an actuator, and a shutoff valve.

FIG. 1 is a schematic diagram of an example of hydraulic actuator system 10 with actuator 12, controller 14, and shutoff valve 16. In the example of FIG. 1, hydraulic actuator system 10 further includes supply line 18, return line 20, first control line 22, second control line 24, extend line 26, and retract line 28. Actuator 12 includes actuator housing 30, piston 32, extend chamber 34, retract chamber 36, and linkage arm 38. Controller 14 includes first control port 40 and second control port 42.

In the example of FIG. 1, actuator 12 is a hydraulic actuator. Actuator housing 30 extends from a first end of actuator 12 toward a second end of actuator 12. Piston 32 is inside of actuator housing 12 and separates an interior of actuator housing 30 to form extend chamber 34 and retract chamber 36. Extend chamber 34 is in actuator housing 30 and can be on a first side of piston 32. Retract chamber 36 is in actuator housing 30 and can be on a second side of piston 32 opposite from extend chamber 34. Linkage arm 38 can be connected to piston 32 and extends from piston 32 through actuator housing 30. Linkage arm 38 can be kinematically connected to a flight control surface (not shown), such as a control surface on a wing, to at least one variable guide vane in a compressor of a gas turbine engine, to an adjustable exhaust nozzle, to a guide surface of a thrust reverser, or any other control surface in an aircraft.

In the example of FIG. 1, controller 14 is an electrohydraulic servo valve that is fluidically connected to supply line 18 and return line 20. Supply line 18 can connect controller 14 to a pressurized fluid source, such as a fuel pump. Return line 20 can connect controller 14 to a low-pressure return, such as a fuel tank, that is at a lower pressure than supply line 18. First control port 40 of controller 14 allows controller 14 to send and receive fluid from a first destination. In the example of FIG. 1, the first destination is extend chamber 34 of actuator 12. Controller 14 can selectively connect first control port 40 with supply line 18 to fill extend chamber 34 to thereby further extend linkage arm 38 from actuator housing 30. While controller 14 connects first control port 40 with supply line 18, controller 14 can selectively connect second control port 42 with return line 22 so that retract chamber 36 can drain while extend chamber 34 fills with fluid. Controller 14 can also selectively connect second control port 42 with supply line 18 to fill retract chamber 36 to cause linkage arm 38 to retract further into actuator housing 30. While controller 14 connects second control port 42 with supply line 18, controller 14 can selectively connect first control port 40 with return line 22 so that extend chamber 34 can drain while retract chamber 36 fills with fluid.

Shutoff valve 16 is positioned fluidically between controller 14 and actuator 12. During standard and regular operation of actuator 12, shutoff valve 16 is in an equilibrium position that allows fluid flow and pressure to pass freely from controller 14 to actuator 12. First control line 22 fluidically connects shutoff valve 16 to first control port 40. Extend line 26 fluidically connects shutoff valve 16 to extend chamber 34 of actuator 12. In the equilibrium position, shutoff valve 16 fluidically connects first control line 22 to extend line 26, thereby fluidically connecting first control port 40 to extend chamber 34. Second control line 24 fluidically connects shutoff valve 16 to second control port 42. Retract line 28 fluidically connects shutoff valve 16 to retract chamber 36 of actuator 12. In the equilibrium position, shutoff valve 16 fluidically connects second control line 24 to retract line 28, thereby fluidically connecting second control port 42 of controller 14 to retract chamber 36 of actuator 12. In the event that the flight control surface connected to linkage arm 38 binds or seizes due to increased friction in the joints of the flight control surface, or due to damage of the flight control surface, or due to ice accumulation on or around the flight control surface, or due to any other reason, shutoff valve 16 can passively move out of the equilibrium position to stop pressure and flow communication between controller 14 and actuator 12. By stopping pressure and flow communication between controller 14 and actuator 12, shutoff valve 16 prevents actuator 12 from exerting excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself. Should the underlying cause for the binding of the flight control surface become resolved (for example, ice on the flight control surface melts away), shutoff valve 16 can passively return to the equilibrium position to allow flow between controller 14 and actuator 12 to resume. With flow reestablished between controller 14 and actuator 12, normal function and control of actuator 12 resumes. An example of shutoff valve 16 is described below with reference to FIGS. 2-3B.

Figure 2:
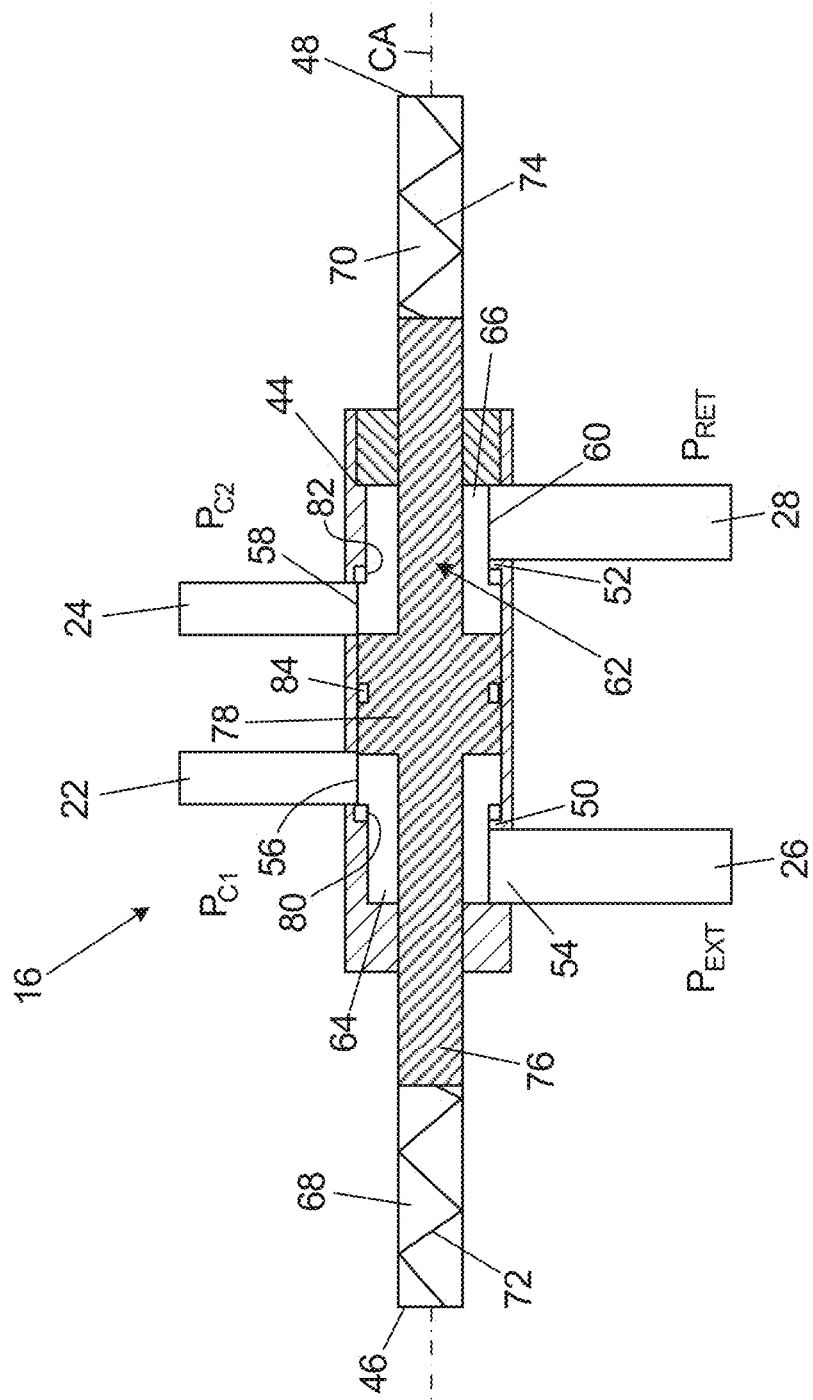
FIG. 2 is a cross-sectional schematic diagram of an example of the shutoff valve of FIG. 1 in a first position.
Figure 3A:
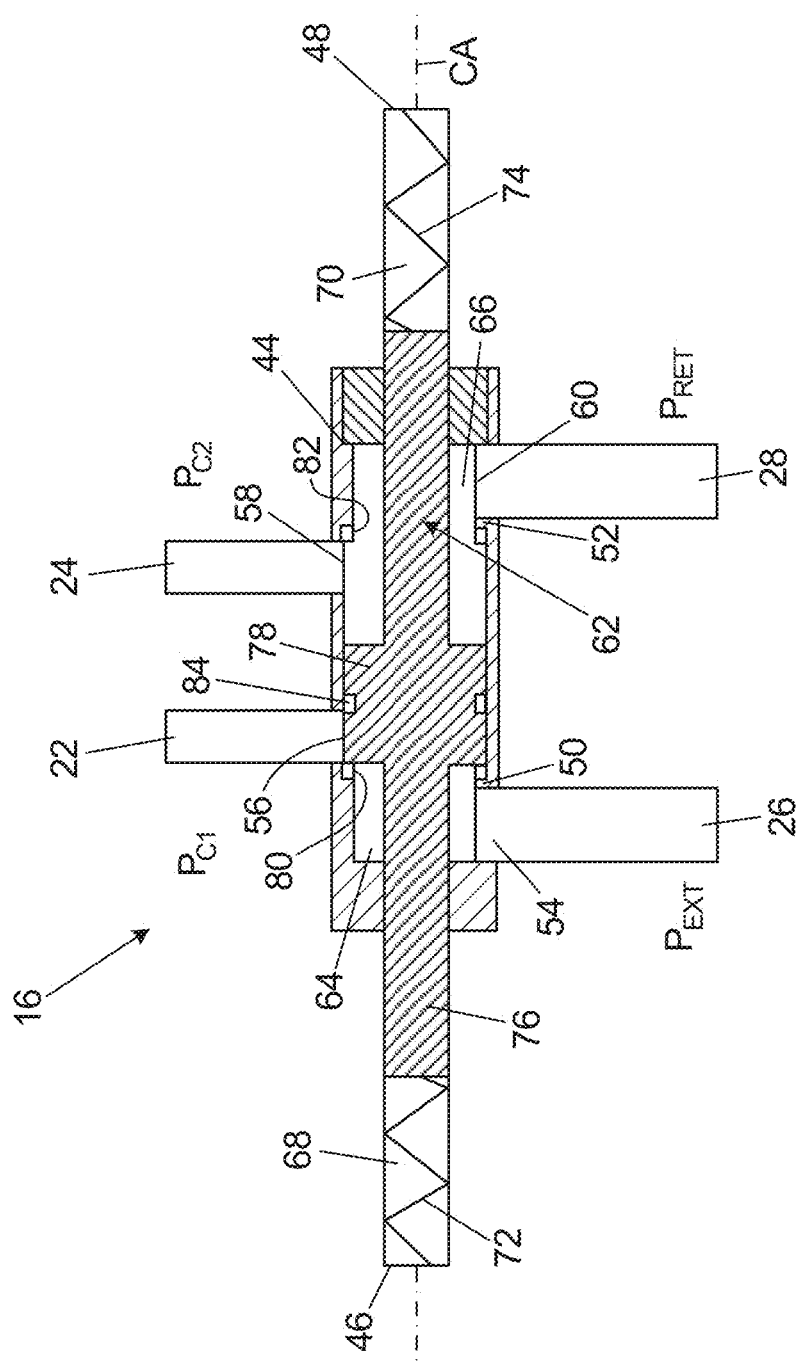
FIG. 3A is another cross-sectional schematic diagram of the shutoff valve of FIG. 2 in a second position.
Figure 3B:
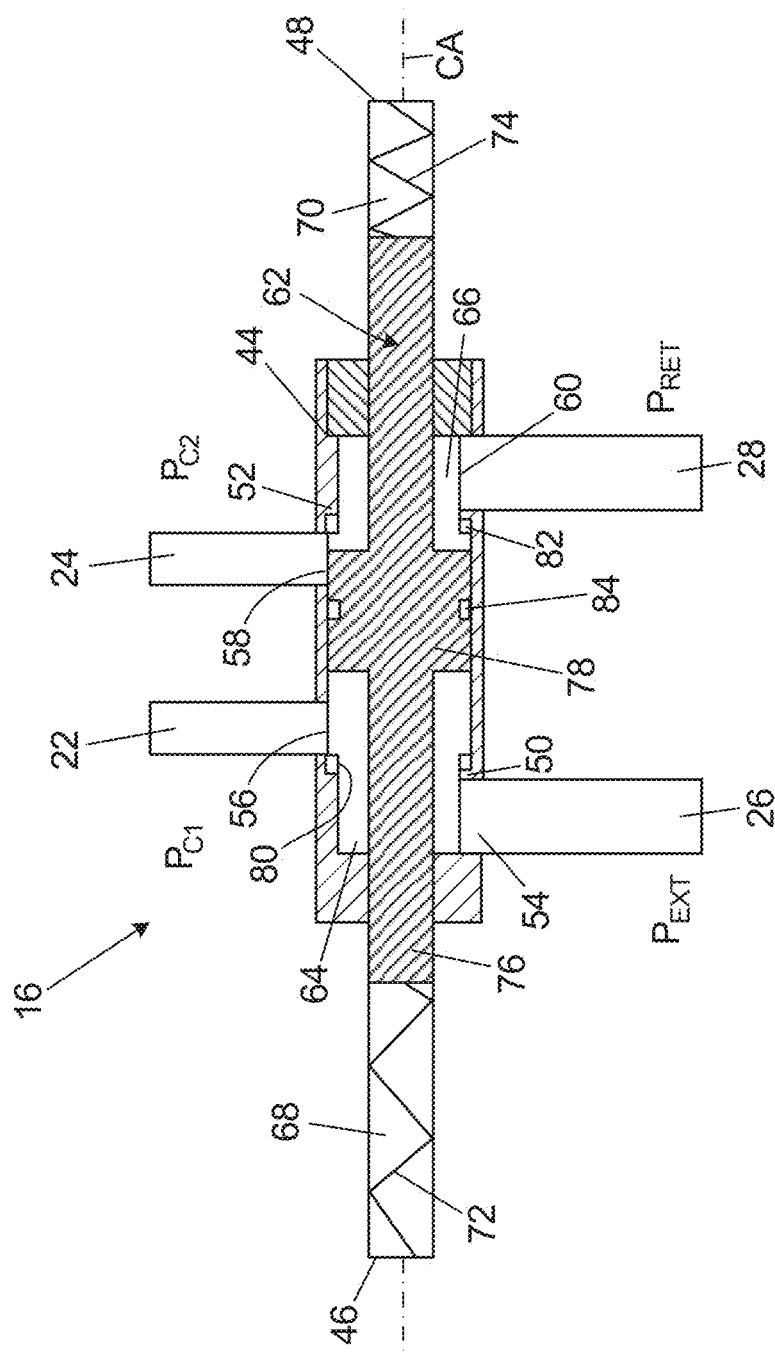
FIG. 3B is another cross-sectional schematic diagram of the shutoff valve of FIG. 2 in a third position.

FIGS. 2-3B will be discussed concurrently. FIG. 2 is a cross-sectional schematic diagram of an example of shutoff valve 16 from FIG. 1 in the equilibrium position. FIG. 3A is another cross-sectional schematic diagram of shutoff valve 16 of FIG. 2 in a first shutoff position. FIG. 3B is another cross-sectional schematic diagram of shutoff valve 16 of FIG. 2 in a second shutoff position. In the example of FIGS. 2-3B, shutoff valve 16 includes valve housing 44, first end 46, second end 48, first valve seat 50, second valve seat 52, first port 54, second port 56, third port 58, fourth port 60, spool 62, first chamber 64, second chamber 66, first spring chamber 68, second spring chamber 70, first spring 72, and second spring 74. Spool 62 includes shaft 76 and land 78. Shutoff valve 16 also includes first seal 80, second seal 82, and third seal 84.

Valve housing 44 extends axially from first end 46 of shutoff valve 16 to second end 48 of shutoff valve 16 relative to center axis CA of shutoff valve 16. First valve seat 50 is in valve housing 44 and is axially between first end 46 and second end 48 of shutoff valve 16. First valve seat 50 can be a first shelf within valve housing 44 that extends radially inward from valve housing 44 relative to center axis CA and that extends circumferentially around center axis CA. In the examples of FIGS. 2-3B, first valve seat 50 faces axially toward second end 48 of shutoff valve 16.

First port 54 extends through valve housing 44 to access an interior of valve housing 44 and is axially between first end 46 of shutoff valve 16 and first valve seat 50. First port 54 can be fluidically connected to extend chamber 34 of actuator 12 by extend line 26. Second port 56 extends through valve housing 44 to access the interior of valve housing 44 and is axially between first valve seat 50 and second end 48 of shutoff valve 16. In the example of FIGS. 2-3B, second port 56 is fluidically connected to first control port 40 by first control line 22. Third port 58 extends through valve housing 44 to access the interior of valve housing 44 and is axially between second port 56 and second end 48 of shutoff valve 16. In the example of FIGS. 2-3B, third port 58 is fluidically connected to second control port 42 of controller 14.

Second valve seat 52 is within valve housing 44 axially between third port 58 and second end 48 of shutoff valve 16. Second valve seat 52 can be a second shelf that extends radially inward from valve housing 44 relative to center axis CA and that extends circumferentially around center axis CA. In the examples of FIGS. 2-3B, second valve seat 52 faces axially toward first end 46 of shutoff valve 16. Fourth port 60 extends through valve housing 44 to fluidically access the interior of housing 44 and is axially between second valve seat 52 and second end 48 of shutoff valve 16 relative to center axis CA. In the example of FIGS. 2-3B, fourth port 60 is fluidically connected to retract chamber 36 of actuator 12 by retract line 28.

Spool 62 is inside valve housing 44 with shaft 76 of spool 62 extending axially between first end 46 and second end 48 of shutoff valve 16. Land 78 can be connected to shaft 76 and is larger in diameter than shaft 76 relative to center axis CA. In the example of FIGS. 2-3B, land 78 is in valve housing 44 and is axially between first valve seat 50 and second valve seat 52. Together, land 78 and valve housing 44 form first chamber 64 and second chamber 66. First chamber 64 is within valve housing 44 and is axially between first end 46 of shutoff valve 16 and land 78. Second chamber 66 is within valve housing 44 and is axially between land 78 and second end 48 of shutoff valve 16. In the example of FIGS. 2-3B, first port 54 fluidically connects with first chamber 64, and second port 56 fluidically connects with first chamber 64 when land 78 is in the equilibrium position. Fourth port 60 fluidically connects with second chamber 66, and third port 58 fluidically connects with second chamber 66 when land 78 is in the equilibrium position. In the example of FIGS. 2-3B, the equilibrium position is defined as the axial position between second port 56 and third port 58. Thus, spool 62 is in the equilibrium position within valve housing 44 when land 78 is axially between second port 56 and third port 58.

First spring chamber 68 can be formed in valve housing 44 axially between first end 46 and first chamber 64. First spring 72 can be in first spring chamber 68 between spool 62 and first end 46 of shutoff valve 16. Second spring chamber 70 can be formed in valve housing 44 axially between second end 48 and second chamber 66. Second spring 74 can be in second spring chamber 70 between spool 62 and second end 48 of shutoff valve 16. First spring 72 and second spring 74 together bias spool 62 such that land 78 defaults to the equilibrium position between second port 56 and third port 58. In other examples, shutoff valve 16 can include a single spring that bias spool 62 such that land 78 defaults to the equilibrium position between second port 56 and third port 58.

First seal 80 can be on first valve seat 50 and extend circumferentially about center axis CA of shutoff valve 16. In other examples, first seal 80 can be connected to land 78 on the side of land 78 facing first valve seat 50 instead of being connected to first valve seat 50. Second seal 82 can be on second valve seat 52 and extend circumferentially about center axis CA of shutoff valve 16. In other examples, second seal 82 can be connected to land 78 on the side of land 78 facing second valve seat 52 instead of being connected to second valve seat 52. Third seal 84 can be on land 78 of spool 62 and extend circumferentially on land 78 about center axis CA. Third seal 84 can be axially positioned on land 78 between second port 56 and third port 58. First seal 80, second seal 82, and third seal 84 can all be elastomeric seals.

When land 78 is in the equilibrium position, controller 14 can send fluid from supply line 18 to extend chamber 34 of actuator 12 via first control line 22, second port 56, first chamber 64, first port 54, and extend line 26. Furthermore, actuator 12 can also send fluid from extend chamber 34 to controller 14 and return line 20 via extend line 26, first port 54, first chamber 64, second port 56, and first control line 22 when land 78 is in the equilibrium position. When land 78 is in the equilibrium position, controller 14 can also send fluid from supply line 18 to retract chamber 36 of actuator 12 via second control line 24, third port 58, second chamber 66, fourth port 60, and retract line 28. Furthermore, actuator 12 can also send fluid from retract chamber 36 to controller 14 and return line 20 via retract line 28, fourth port 60, second chamber 66, third port 58, and second control line 24 when land 78 is in the equilibrium position.

During normal operating conditions of controller 14 and actuator 12, when the pressure $P_{c1}$ in first control line 22 and the pressure $P_{ext}$ in extend line 26 are both generated by the supply pressure in supply line 18, and when the pressure $P_{c2}$ in second control line 24 and the pressure $P_{ret}$ in retract line 28 are related to the return pressure in return line 20, extend chamber 34 of actuator 12 will fill with fluid while retract chamber 36 of actuator 12 will empty, thereby causing linkage arm 38 of actuator 12 to extend. Also during normal operating conditions of controller 14 and actuator 12, when the pressure $P_{c1}$ in first control line 22 and the pressure $P_{ext}$ in extend line 26 are both related to the return pressure in return line 20, and when the pressure $P_{c2}$ in second control line 24 and the pressure $P_{ret}$ in retract line 28 are generated from the supply pressure in supply line 18, retract chamber 36 of actuator 12 will fill with fluid while extend chamber 34 of actuator 12 will empty, thereby causing linkage arm 38 of actuator 12 to retract. During normal operation pressures of actuator 12 and controller 14, first spring 72 and second spring 74 keep land 78 in the equilibrium position. First spring 72 and second spring 74 can include a size and stiffness that prevents spool 62 from reacting to normal operating pressures of actuator 12.

As shown in FIGS. 3A and 3B, in the event that the flight control surface connected to linkage arm 38 binds or seizes, the pressure inside first chamber 64 or second chamber 66 will increase above the normal operating pressures of actuator 12, thereby causing spool 62 to react and move out of the equilibrium position. In the example of FIG. 3A, first control line 22 is fluidically connected to return line 20 by controller 14, and second control line 24 is fluidically connected to supply line 18 by controller 14. Linkage arm 38 (shown in FIG. 1) is connected to a flight control surface that is seized or binding, such that actuator 12 cannot retract linkage arm 38 under normal operating pressures and the pressure in retract line 28, second chamber 66, and second control line 24 is beginning to increase above the normal operating pressures of actuator 12. In response to the pressure in second chamber 66 increasing above the normal operating pressures of actuator 12, spool 62 shifts toward first end 46 of shutoff valve 16, causing land 78 to contact first seal 80 and block second port 56 connected to first control line 22. Third seal 84 between land 78 and valve housing 44 prevents any pressure leakage across land 78. With second port 56 blocked, fluid flow out of extend chamber 34 of actuator 12 is blocked, thereby preventing the pressure in retract chamber 36 from moving piston 32 and linkage arm 38. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself.

In the example of FIG. 3B, second control line 24 is fluidically connected to return line 20 by controller 14, and first control line 22 is fluidically connected to supply line 18 by controller 14. Linkage arm 38 (shown in FIG. 1) is connected to a flight control surface that is seized or binding, such that actuator 12 cannot extend linkage arm 38 under normal operating pressures and the pressure in extend line 26, first chamber 64, and first control line 22 is beginning to increase above the normal operating pressures of actuator 12. In response to the pressure in first chamber 64 increasing above the normal operating pressures of actuator 12, spool 62 shifts toward second end 48 of shutoff valve 16, causing land 78 to contact second seal 82 and block third port 58 connected to second control line 24. Third seal 84 between land 78 and valve housing 44 prevents any pressure leakage across land 78. With third port 58 blocked, fluid flow out of retract chamber 36 of actuator 12 is blocked, thereby preventing the pressure in extend chamber 34 from moving piston 32 and linkage arm 38. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself.

Figure 4:
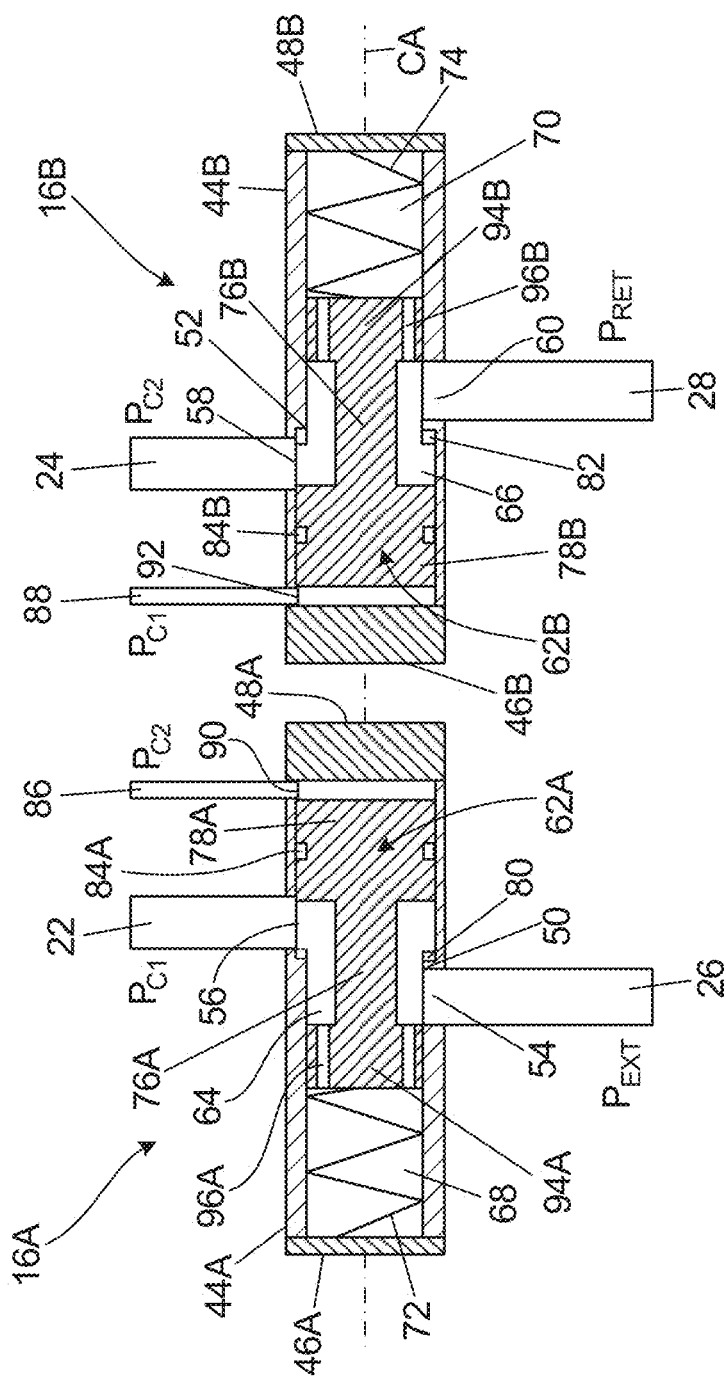
FIG. 4 is a cross-sectional schematic diagram of another example with two shutoff valves.

FIG. 4 is a cross-sectional schematic diagram of another example where shutoff valve 16 of FIG. 1 includes first valve 16a and second valve 16b. In the example of FIG. 4, first valve 16a includes first valve housing 44a, first end 46a, second end 48a, first valve seat 50, first port 54, second port 56, fifth port 90, first spool 62a, first chamber 64, first spring chamber 68, and first spring 72. First spool 62a includes first shaft 76a, first land 78a, first head 94a, and first passages 96a. First valve 16a also includes first seal 80 and third seal 84a. Second valve 16b includes second valve housing 44b, first end 46b, second end 48b, second valve seat 52, third port 58, fourth port 60, sixth port 92, second spool 62b, second chamber 66, second spring chamber 70, and second spring 74. Second spool 62b includes second shaft 76b, second land 78b, second head 94b, and second passages 96b. Second valve 16b also includes second seal 82 and fourth seal 84b. Hydraulic actuator system 10 also includes first pressure line 86 and second pressure line 88.

First valve housing 44a extends axially from first end 46a of first valve 16a to second end 48a of first valve 16a relative to center axis CA of first valve 16a. First valve seat 50 is in first valve housing 44a and is axially between first end 46a and second end 48a of first valve 16a. First valve seat 50 can be a first shelf within first valve housing 44a that extends radially inward from first valve housing 44a relative to center axis CA and that extends circumferentially around center axis CA of first valve 16a. In the example of FIG. 4, first valve seat 50 faces axially toward second end 48a of first valve 16a.

First port 54 extends through first valve housing 44a to access an interior of first valve housing 44a and is axially between first end 46a of first valve 16a and first valve seat 50. First port 54 can be fluidically connected to extend chamber 34 of actuator 12 by extend line 26. Second port 56 extends through first valve housing 44a to access the interior of first valve housing 44a and is axially between first valve seat 50 and second end 48a of first valve 16a. In the example of FIG. 4, second port 56 is fluidically connected to first control port 40 by first control line 22. Fifth port 90 extends through first valve housing 44a to access an interior of first valve housing 44a and is axially between second port 56 and second end 48a of first valve 16a. In the example of FIG. 4, fifth port 90 is fluidically connected to first pressure line 86. First pressure line 86 is fluidically connected to second control line 24 and/or second control port 42 of controller 14.

Second valve housing 44b extends axially from first end 46b of second valve 16b to second end 48b of second valve 16b relative to center axis CA of second valve 16b. While second valve housing 44b and first valve housing 44a appear to be axially aligned in FIG. 4 on a common axis, in practice first valve housing 44a and second valve housing 44b can be misaligned from one another. Second valve seat 52 is within second valve housing 44b axially between first end 46b and second end 48b of second valve 16b. Second valve seat 52 is a second shelf that extends radially inward from second valve housing 44b relative to center axis CA of second valve 16b and that extends circumferentially around center axis CA. In the example of FIG. 4, second valve seat 52 faces axially toward first end 46b of second valve 16b.

Sixth port 92 extends through second valve housing 44b to access an interior of second valve housing 44b and is axially between first end 46b of second valve 16b and second valve seat 52. In the example of FIG. 4, sixth port 92 is fluidically connected to second pressure line 88. Second pressure line 88 is fluidically connected to first control line 22 and/or first control port 40 of controller 14. Third port 58 extends through second valve housing 44b to access the interior of second valve housing 44b and is axially between sixth port 92 and second valve seat 52. In the example of FIG. 4, third port 58 is fluidically connected to second control port 42 of controller 14 by second control line 24. Fourth port 60 extends through second valve housing 44b to fluidically access the interior of second valve housing 44b and is axially between second valve seat 52 and second end 48b of second valve 16b relative to center axis CA. In the example of FIG. 4, fourth port 60 is fluidically connected to retract chamber 36 of actuator 12 by retract line 28.

First spool 62a is inside first valve housing 44a with first shaft 76a of first spool 62a extending axially between first end 46a and second end 48a of first valve 16a. First land 78a is connected to first shaft 76a and is larger in diameter than first shaft 76a relative to center axis CA of first valve 16a. In the example of FIG. 4, first land 78a is in first valve housing 44a and is axially between first valve seat 50 and second end 48a of first valve 16a. First head 94a is connected to first shaft 76a opposite first land 78a. First head 94a is positioned axially between first end 46a of first valve 16a and first valve seat 50. First head 94a is larger in diameter than first shaft 76a and forms a first spring seat for first spring 72. Together, first land 78a, first valve housing 44a, and first head 94a form first chamber 64. First chamber 64 is within first valve housing 44a and is axially between first head 94a and first land 78a. In the example of FIG. 4, first port 54 fluidically connects with first chamber 64, and second port 56 fluidically connects with first chamber 64 when first land 78a is in the equilibrium position of first valve 16a. In the example of FIG. 4, first spool 62a is in the equilibrium position within first valve housing 44a when first land 78a is axially between second port 56 and fifth port 90.

First spring chamber 68 can be formed in first valve housing 44a axially between first end 46a and first head 94a. First passages 96a can be formed in first head 94a to fluidically connect first spring chamber 68 with first chamber 64 such that first spring chamber 68 can always be at the same pressure as first chamber 64. First spring 72 can be in first spring chamber 68 between first head 94a and first end 46a of first valve 16a. First spring 72 biases first spool 62a such that first land 78a defaults to the equilibrium position between second port 56 and fifth port 90.

Second spool 62b can be inside second valve housing 44b with second shaft 76b of second spool 62b extending axially between first end 46b and second end 48b of second valve 16b. Second land 78b is connected to second shaft 76b and is larger in diameter than second shaft 76b relative to center axis CA of second valve 16b. In the example of FIG. 4, second land 78b is in second valve housing 44b and is axially between first end 46b of second valve 16b and second valve seat 52. Second head 94b is connected to second shaft 76b opposite second land 78b. Second head 94b is positioned axially between second valve seat 52 and second end 48b of second valve 16b. Second head 94b is larger in diameter than second shaft 76b and forms a second spring seat for second spring 74. Together, second land 78b, second valve housing 44b, and second head 94b form second chamber 66. Second chamber 66 is within second valve housing 44b and is axially between second land 78b and second head 94b. In the example of FIG. 4, fourth port 60 fluidically connects with second chamber 66, and third port 58 fluidically connects with second chamber 66 when second land 78b is in the equilibrium position of second valve 16b. In the example of FIG. 4, second spool 62b is in the equilibrium position within second valve housing 44b when second land 78b is axially between sixth port 92 and third port 58.

Second spring chamber 70 can be formed in second valve housing 44b axially between second end 48b and second head 94b. Second passages 96b can be formed in second head 94b to fluidically connect second spring chamber 70 with second chamber 66 such that second spring chamber 70 can always be at the same pressure as second chamber 66. Second spring 74 can be in second spring chamber 70 between second head 94b and second end 48b of second valve 16b. Second spring 74 biases second spool 62b such that second land 78b defaults to the equilibrium position of second valve 16b between sixth port 92 and third port 58.

First seal 80 can be on first valve seat 50 and extend circumferentially about center axis CA of first valve 16a. In other examples, first seal 80 can be connected to first land 78a on the side of first land 78a facing first valve seat 50 instead of being connected to first valve seat 50. Second seal 82 can be on second valve seat 52 and extend circumferentially about center axis CA of second valve 16b. In other examples, second seal 82 can be connected to second land 78b on the side of second land 78b facing second valve seat 52 instead of being connected to second valve seat 52. Third seal 84a can be on first land 78a of first spool 62a and extend circumferentially on first land 78a about center axis CA. Third seal 84 can be axially positioned on first land 78a between second port 56 and fifth port 90. Fourth seal 84b can be on second land 78b of second spool 62b and extend circumferentially on second land 78b about center axis CA. Fourth seal 84b can be axially positioned on second land 78b between sixth port 92 and third port 58. First seal 80, second seal 82, third seal 84a, and fourth seal 84b can all be elastomeric seals.

When first land 78a and second land 78b are in the equilibrium position, controller 14 can send fluid from supply line 18 to extend chamber 34 of actuator 12 via first control line 22, second port 56, first chamber 64, first port 54, and extend line 26. Furthermore, actuator 12 can also send fluid from extend chamber 34 to controller 14 and return line 20 via extend line 26, first port 54, first chamber 64, second port 56, and first control line 22 when first land 78a and second land 78b are in the equilibrium position. When first land 78a and second land 78b are in the equilibrium position, controller 14 can also send fluid from supply line 18 to retract chamber 36 of actuator 12 via second control line 24, third port 58, second chamber 66, fourth port 60, and retract line 28. Furthermore, actuator 12 can also send fluid from retract chamber 36 to controller 14 and return line 20 via retract line 28, fourth port 60, second chamber 66, third port 58, and second control line 24 when first land 78a and second land 78b are in the equilibrium position.

During normal operating conditions of controller 14 and actuator 12, when the pressure $P_{c1}$ in first control line 22 and second pressure line 88 and the pressure $P_{ext}$ in extend line 26 are both generated by the supply pressure in supply line 18, and when the pressure $P_{c2}$ in second control line 24 and first pressure line 86 and the pressure $P_{ret}$ in retract line 28 are related to the return pressure in return line 20, extend chamber 34 of actuator 12 will fill with fluid while retract chamber 36 of actuator 12 will empty, thereby causing linkage arm 38 of actuator 12 to extend. Also during normal operating conditions of controller 14 and actuator 12, when the pressure $P_{c1}$ in first control line 22 and second pressure line 88 and the pressure $P_{ext}$ in extend line 26 are both related to the return pressure in return line 20, and when the pressure $P_{c2}$ in second control line 24 and first pressure line 86 and the pressure $P_{ret}$ in retract line 28 are generated from the supply pressure in supply line 18, retract chamber 36 of actuator 12 will fill with fluid while extend chamber 34 of actuator 12 will empty, thereby causing linkage arm 38 of actuator 12 to retract. During normal operation pressures of actuator 12 and controller 14, first spring 72 and second spring 74 keep first land 78a and second land 78b respectively in the equilibrium position. First spring 72 and second spring 74 can include a size and stiffness that prevents first spool 62a and second spool 62b from reacting to normal operating pressures of actuator 12.

Similar to the example of shutoff valve 16 described above with reference to FIGS. 2-3B, in the event that a flight control surface connected to linkage arm 38 binds or seizes, the pressure inside first chamber 64 or second chamber 66 will increase above the normal operating pressures of actuator 12, thereby causing first spool 62a in first valve 16a to move out of the equilibrium position and shut against first valve seat 50 to block second port 56, or causing second spool 62b in second valve 16b to move out of the equilibrium position and shut against second valve seat 52 to block fourth port 60. With second port 56 or fourth port 60 blocked, fluid flow in and out of actuator 12 is stopped, thereby preventing piston 32 and linkage arm 38 from moving. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself.

Figure 5:
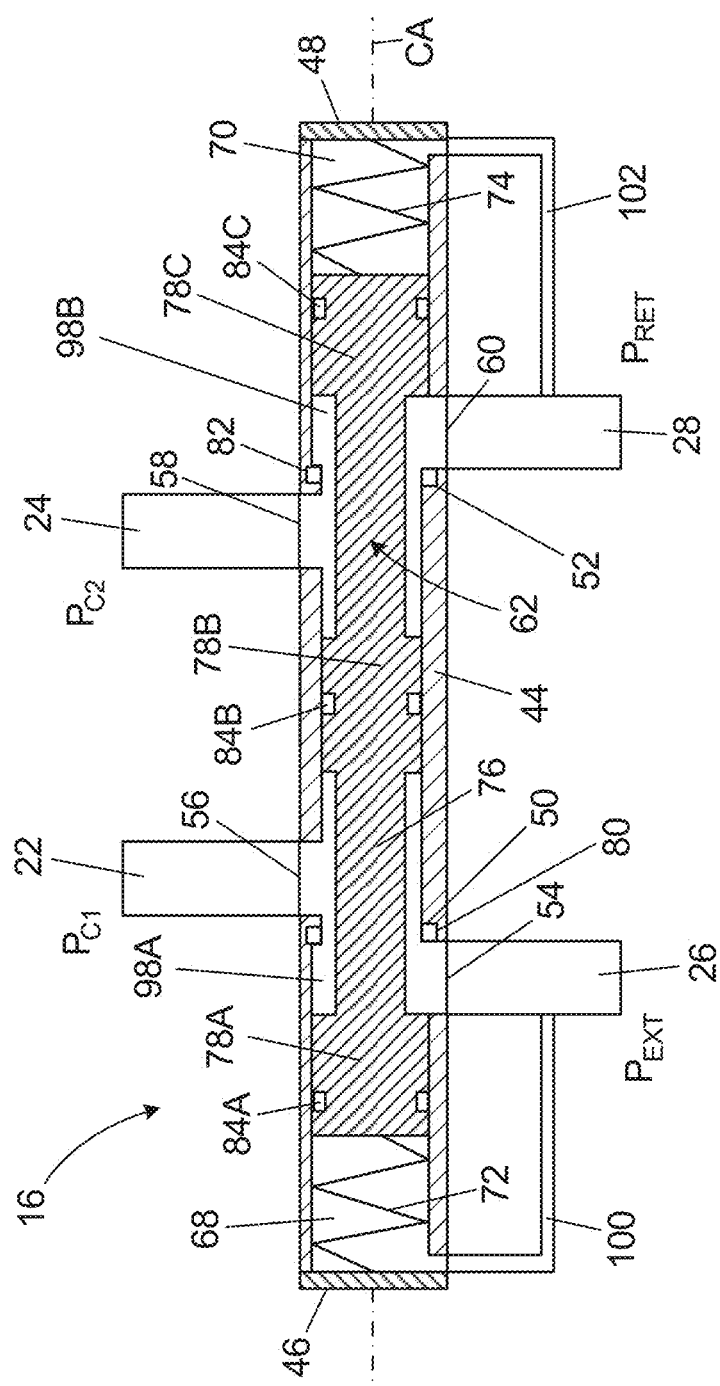
FIG. 5 is a cross-sectional schematic diagram of another example of the shutoff valve of FIG. 1 in a first position.
Figure 6A:
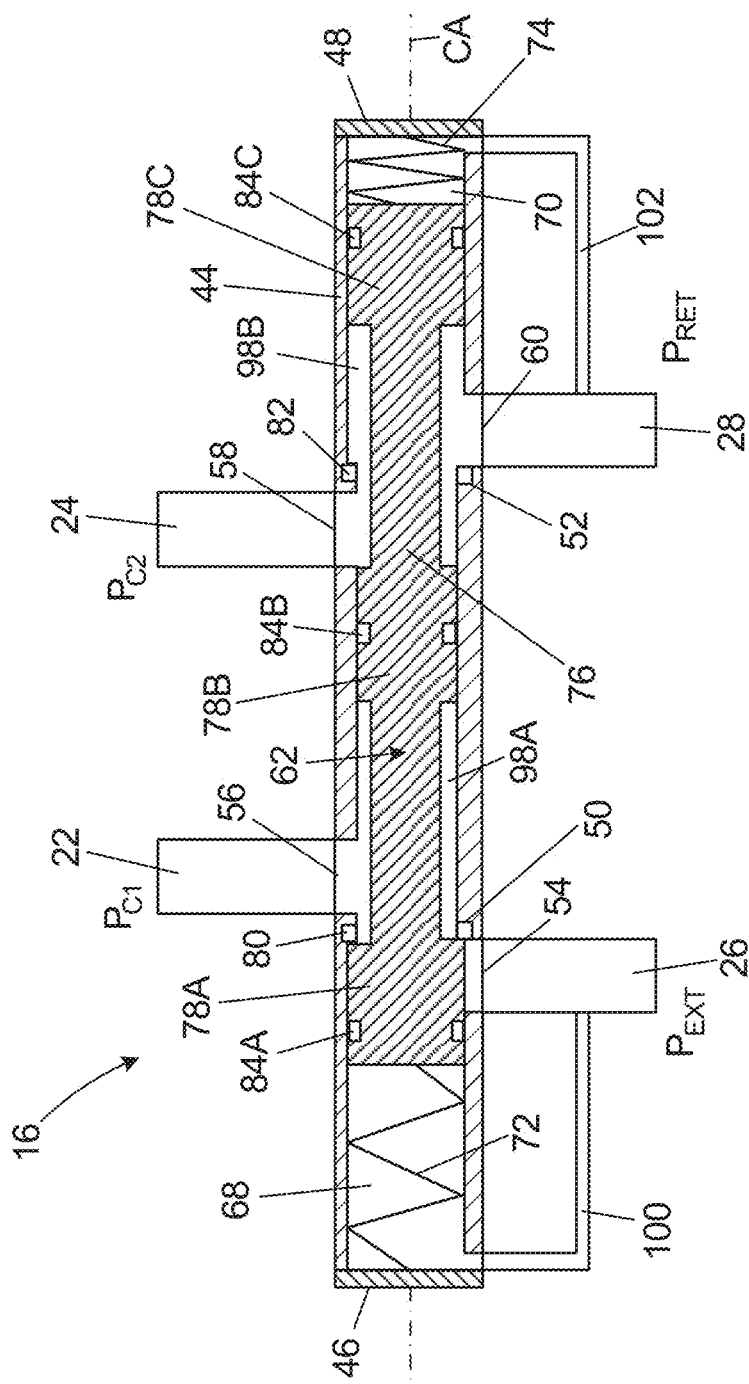
FIG. 6A is another cross-sectional schematic diagram of the shutoff valve of FIG. 5 in a second position.
Figure 6B:
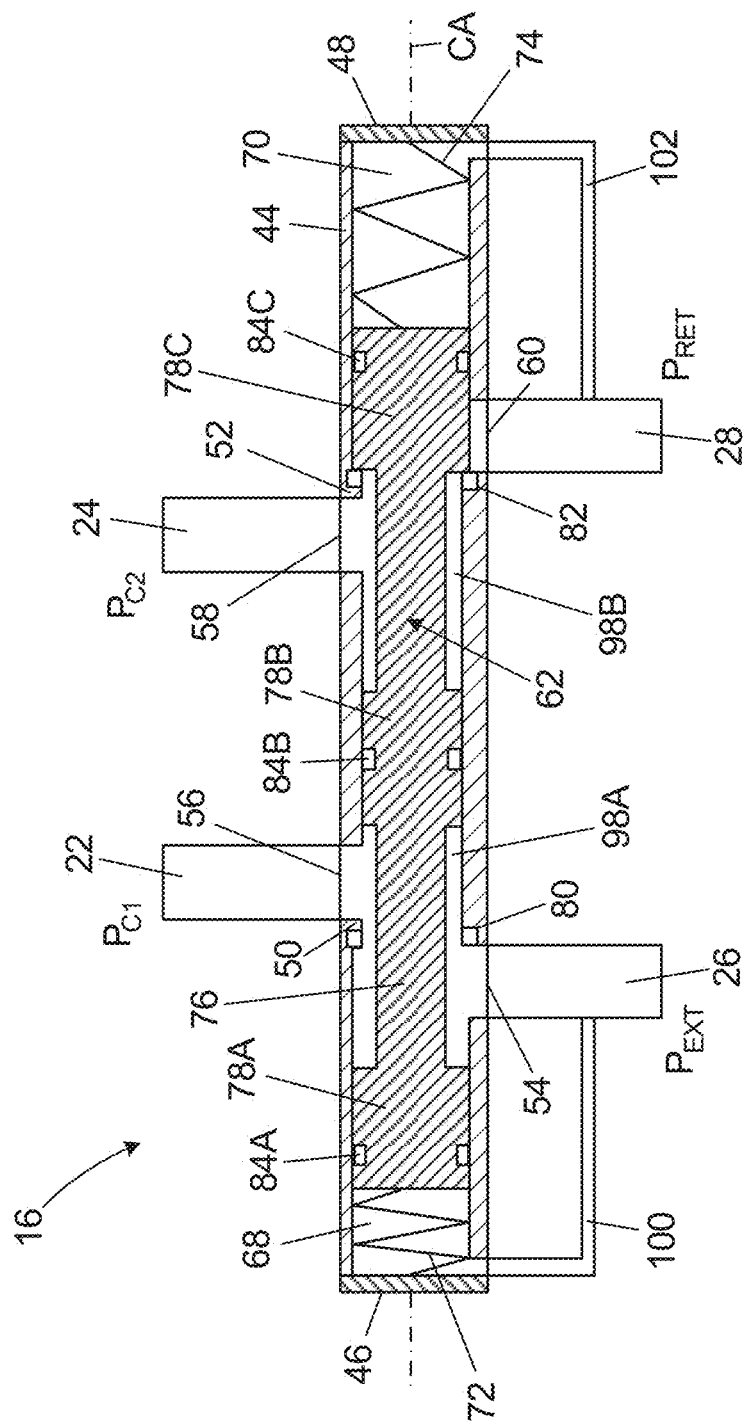
FIG. 6B is another cross-sectional schematic diagram of the shutoff valve of FIG. 5 in a third position.

Another example of shutoff valve 16 is shown in FIGS. 5-6B. FIGS. 5-6B will be discussed concurrently. FIG. 5 is a cross-sectional schematic diagram of an example of shutoff valve 16 from FIG. 1 in an equilibrium position. FIG. 6A is another cross-sectional schematic diagram of shutoff valve 16 of FIG. 5 in a first shutoff position. FIG. 6B is another cross-sectional schematic diagram of shutoff valve 16 of FIG. 5 in a second shutoff position. In the example of FIGS. 5-6B, shutoff valve 16 includes valve housing 44, first end 46, second end 48, first valve seat 50, second valve seat 52, first port 54, second port 56, third port 58, fourth port 60, spool 62, first window 98a, second window 98b, first spring chamber 68, second spring chamber 70, first spring 72, and second spring 74. Spool 62 includes shaft 76, first land 78a, second land 78b, and third land 78c. Shutoff valve 16 also includes first seal 80, second seal 82, third seal 84a, fourth seal 84b, fifth seal 84c, first reference line 100, and second reference line 102.

Valve housing 44 extends axially from first end 46 of shutoff valve 16 to second end 48 of shutoff valve 16 relative to center axis CA of shutoff valve 16. First valve seat 50 is in valve housing 44 and is axially between first end 46 and second end 48 of shutoff valve 16. First valve seat 50 can be a first shelf within valve housing 44 that extends radially inward from valve housing 44 relative to center axis CA and that extends circumferentially around center axis CA. In the examples of FIGS. 5-6B, first valve seat 50 faces axially toward first end 46 of shutoff valve 16.

First port 54 extends through valve housing 44 to access an interior of valve housing 44 and is axially between first end 46 of shutoff valve 16 and first valve seat 50. First port 54 can be fluidically connected to extend chamber 34 of actuator 12 by extend line 26. Second port 56 extends through valve housing 44 to access the interior of valve housing 44 and is axially between first valve seat 50 and second end 48 of shutoff valve 16. In the example of FIGS. 5-6B, second port 56 is fluidically connected to first control port 40 by first control line 22. Third port 58 extends through valve housing 44 to access the interior of valve housing 44 and is axially between second port 56 and second end 48 of shutoff valve 16. In the example of FIGS. 5-6B, third port 58 is fluidically connected to second control port 42 of controller 14.

Second valve seat 52 is within valve housing 44 and is axially between third port 58 and second end 48 of shutoff valve 16. Second valve seat 52 can be a second shelf that extends radially inward from valve housing 44 relative to center axis CA and that extends circumferentially around center axis CA. In the examples of FIGS. 5-6B, second valve seat 52 faces axially toward second end 48 of shutoff valve 16. Fourth port 60 extends through valve housing 44 to fluidically access the interior of housing 44 and is axially between second valve seat 52 and second end 48 of shutoff valve 16 relative to center axis CA. In the example of FIGS. 5-6B, fourth port 60 is fluidically connected to retract chamber 36 of actuator 12 by retract line 28.

Spool 62 is inside valve housing 44 with shaft 76 of spool 62 extending axially between first end 46 and second end 48 of shutoff valve 16. First land 78a, second land 78b, and third land 78c are connected to shaft 76 and are each larger in diameter than shaft 76 relative to center axis CA. In the example of FIGS. 5-6B, first land 78a, second land 78b, and third land 78c are equal in diameter to simplify manufacturing of spool 62. In other examples, first land 78a, second land 78b, and third land 78c can have different diameters. In the example of FIGS. 5-6B, second land 78b is positioned axially between first land 78a and third land 78c. First land 78a is spaced axially from second land 78b to form first window 98a. Third land 78c is spaced axially from second land 78b to form second window 98a. First land 78a is positioned axially inside valve housing 44 between first valve seat 50 and first end 46. Second land 78b is positioned axially inside valve housing 44 between first valve seat 50 and second valve seat 52. Third land 78c is positioned axially inside valve housing 44 between second valve seat 52 and second end 48. In the example of FIGS. 5-6B, second port 56 fluidically connects with first window 98a, and first port 54 fluidically connects with first window 98a when spool 62 is in an equilibrium position. Third port 58 fluidically connects with second window 98b, and fourth port 60 fluidically connects with second window 98b when spool 62 is in the equilibrium position. In the example of FIGS. 5-6B, spool 62 is in the equilibrium position within valve housing 44 when first land 78a is axially between first port 54 and first end 46 and second land 78b is axially between fourth port 60 and second end 48.

First spring chamber 68 can be formed in valve housing 44 axially between first end 46 and first land 78a. First spring 72 can be in first spring chamber 68 between first land 78a and first end 46 of shutoff valve 16. Second spring chamber 70 can be formed in valve housing 44 axially between second end 48 and third land 78c. Second spring 74 can be in second spring chamber 70 between third land 78c and second end 48 of shutoff valve 16. First spring 72 and second spring 74 together bias spool 62 such that spool 62 defaults to the equilibrium position. In other examples, shutoff valve 16 can include a single spring that bias spool 62 to the equilibrium position shown in FIG. 5. First reference line 100 is a fluid line that can fluidically connect first spring chamber 68 to extend line 26 such that first spring chamber 68 and extend line 26 are at the same pressure during operation of hydraulic actuator system 10 (shown in FIG. 1). Second reference line 102 is a fluid line that can fluidically connect second spring chamber 70 to retract line 28 such that second spring chamber 70 and retract line 28 are at the same pressure during operation of hydraulic actuator system 10. By fluidically connecting first spring chamber 68 and extend line 26, and fluidically connecting second spring chamber 70 and retract line 28, the pressures in first spring chamber 68 and second spring chamber 70 can be used to help drive spool 62 while also limiting a slew rate of spool 62 at high pressures.

First seal 80 can be on first valve seat 50 and extend circumferentially about center axis CA of shutoff valve 16. In other examples, first seal 80 can be connected to first land 78a on the side of first land 78a facing first valve seat 50 instead of being connected to first valve seat 50. Second seal 82 can be on second valve seat 52 and extend circumferentially about center axis CA of shutoff valve 16. In other examples, second seal 82 can be connected to third land 78c on the side of third land 78c facing second valve seat 52 instead of being connected to second valve seat 52. Third seal 84 can be on land 78 of spool 62 and extend circumferentially on land 78 about center axis CA. Third seal 84a can be on first land 78a, fourth seal 84b can be on second land 78b, and fifth seal 84c can be on third land 78c. First seal 80, second seal 82, third seal 84a, fourth seal 84b, and fifth seal 84c can all be elastomeric seals.

When spool 62 is in the equilibrium position, as shown in FIG. 5, controller 14 can send fluid from supply line 18 to extend chamber 34 of actuator 12 via first control line 22, second port 56, first window 98a, first port 54, and extend line 26. Furthermore, actuator 12 can also send fluid from extend chamber 34 to controller 14 and return line 20 via extend line 26, first port 54, first window 98a, second port 56, and first control line 22 when spool 62 is in the equilibrium position. When spool 62 is in the equilibrium position, controller 14 can also send fluid from supply line 18 to retract chamber 36 of actuator 12 via second control line 24, third port 58, second window 98b, fourth port 60, and retract line 28. Furthermore, actuator 12 can also send fluid from retract chamber 36 to controller 14 and return line 20 via retract line 28, fourth port 60, second window 98b, third port 58, and second control line 24 when spool 62 is in the equilibrium position.

During normal operating conditions of controller 14 and actuator 12, when the pressure $P_{c1}$ in first control line 22 and the pressure $P_{ext}$ in extend line 26 are both generated by the supply pressure in supply line 18, and when the pressure $P_{c2}$ in second control line 24 and the pressure $P_{ret}$ in retract line 28 are related to the return pressure in return line 20, extend chamber 34 of actuator 12 will fill with fluid while retract chamber 36 of actuator 12 will empty, thereby causing linkage arm 38 of actuator 12 to extend. Also during normal operating conditions of controller 14 and actuator 12, when the pressure $P_{c1}$ in first control line 22 and the pressure $P_{ext}$ in extend line 26 are both related to the return pressure in return line 20, and when the pressure $P_{c2}$ in second control line 24 and the pressure $P_{ret}$ in retract line 28 are generated from the supply pressure in supply line 18, retract chamber 36 of actuator 12 will fill with fluid while extend chamber 34 of actuator 12 will empty, thereby causing linkage arm 38 of actuator 12 to retract. During normal operation pressures of actuator 12 and controller 14, first spring 72 and second spring 74 keep spool 62 in the equilibrium position. First spring 72 and second spring 74 can include a size and stiffness that prevents spool 62 from reacting to normal operating pressures of actuator 12.

As shown in FIGS. 6A and 6B, in the event that the flight control surface connected to linkage arm 38 binds or seizes, the pressure inside first window 98a and first spring chamber 68 or the pressure inside second window 98b and second spring chamber 70 will increase above the normal operating pressures of actuator 12, thereby causing spool 62 to react and move out of the equilibrium position. In the example of FIG. 6A, second control line 24 is fluidically connected to return line 20 by controller 14, and first control line 22 is fluidically connected to supply line 18 by controller 14. Linkage arm 38 (shown in FIG. 1) is connected to a flight control surface that is seized or binding, such that actuator 12 cannot extend linkage arm 38 under normal operating pressures and the pressure in extend line 22, first window 98a, first spring chamber 68, and first control line 22 is beginning to increase above the normal operating pressures of actuator 12. In response to the pressure in first spring chamber 68 and first window 98a increasing above the normal operating pressures of actuator 12, spool 62 shifts toward second end 48 of shutoff valve 16, causing first land 78a to contact first seal 80 and block first port 54 connected to extend line 26. Third seal 84a, fourth seal 84b, and fifth seal 84c between spool 62 and valve housing 44 prevents any pressure leakage axially across spool 62. With first port 54 blocked, fluid flow into and out of extend chamber 34 of actuator 12 is blocked, thereby preventing piston 32 and linkage arm 38 from moving. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself. Should flight control surface unseize, the piston 32 and linkage arm 38 will move and cause the pressure inside first spring chamber 68 to decrease and allow first spring 72 and second spring 74 to move spool 62 back to the equilibrium position.

In the example of FIG. 6B, first control line 22 is fluidically connected to return line 20 by controller 14, and second control line 24 is fluidically connected to supply line 18 by controller 14. Linkage arm 38 (shown in FIG. 1) is connected to a flight control surface that is seized or binding, such that actuator 12 cannot retract linkage arm 38 under normal operating pressures and the pressure in retract line 28, second spring chamber 70, second window 98b, and second control line 24 is beginning to increase above the normal operating pressures of actuator 12. In response to the pressure in second spring chamber 70 and second window 98b increasing above the normal operating pressures of actuator 12, spool 62 shifts toward first end 46 of shutoff valve 16, causing third land 78c to contact second seal 82 and block fourth port 60 connected to retract line 28. Third seal 84a, fourth seal 84b, and fifth seal 84c between spool 62 and valve housing 44 prevents any pressure leakage axially across spool 62. With fourth port 60 blocked, fluid flow into and out of retract chamber 36 of actuator 12 is blocked, thereby preventing piston 32 and linkage arm 38 from moving. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, or from actuator 12 damaging itself. Should flight control surface unseize, the piston 32 and linkage arm 38 will move and cause the pressure inside second spring chamber 70 to decrease and allow first spring 72 and second spring 74 to move spool 62 back to the equilibrium position.

Figure 7:
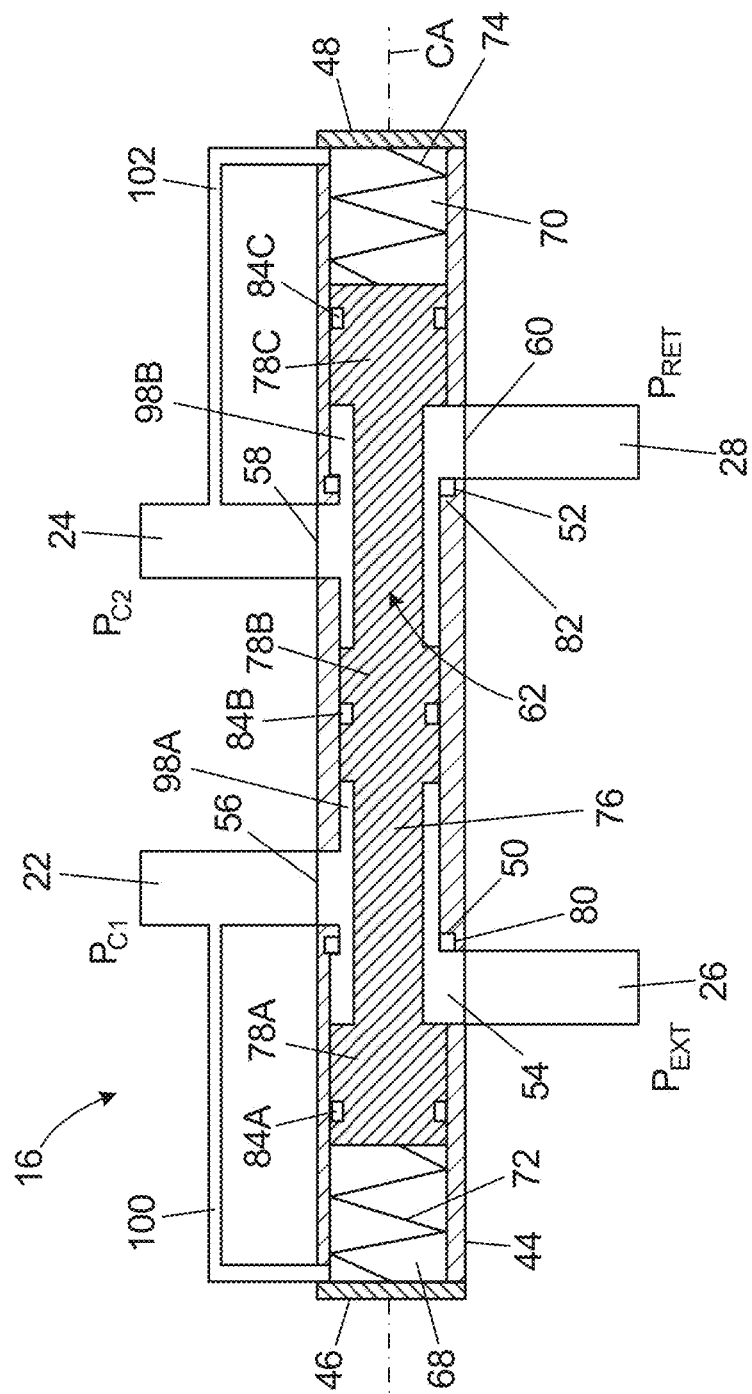
FIG. 7 is a cross-sectional schematic diagram of another example of the shutoff valve of FIG. 1.

FIG. 7 is a cross-sectional schematic diagram of another example of shutoff valve 16 that is similar to the example of FIGS. 5-6B except first reference line 100 fluidically connects first spring chamber 68 to first control line 22 and second reference line 102 fluidically connects second spring chamber 70 to second control line 24. The example of shutoff valve 16 in FIG. 7 operates in similar fashion as the example of FIGS. 5-6B, except shutoff valve 16 in FIG. 8 requires an actively regulated pressure change in first control line 22 or second control line 24 to return spool 62 to the equilibrium position to reopen first port 54 or second port 60.

Figure 8:
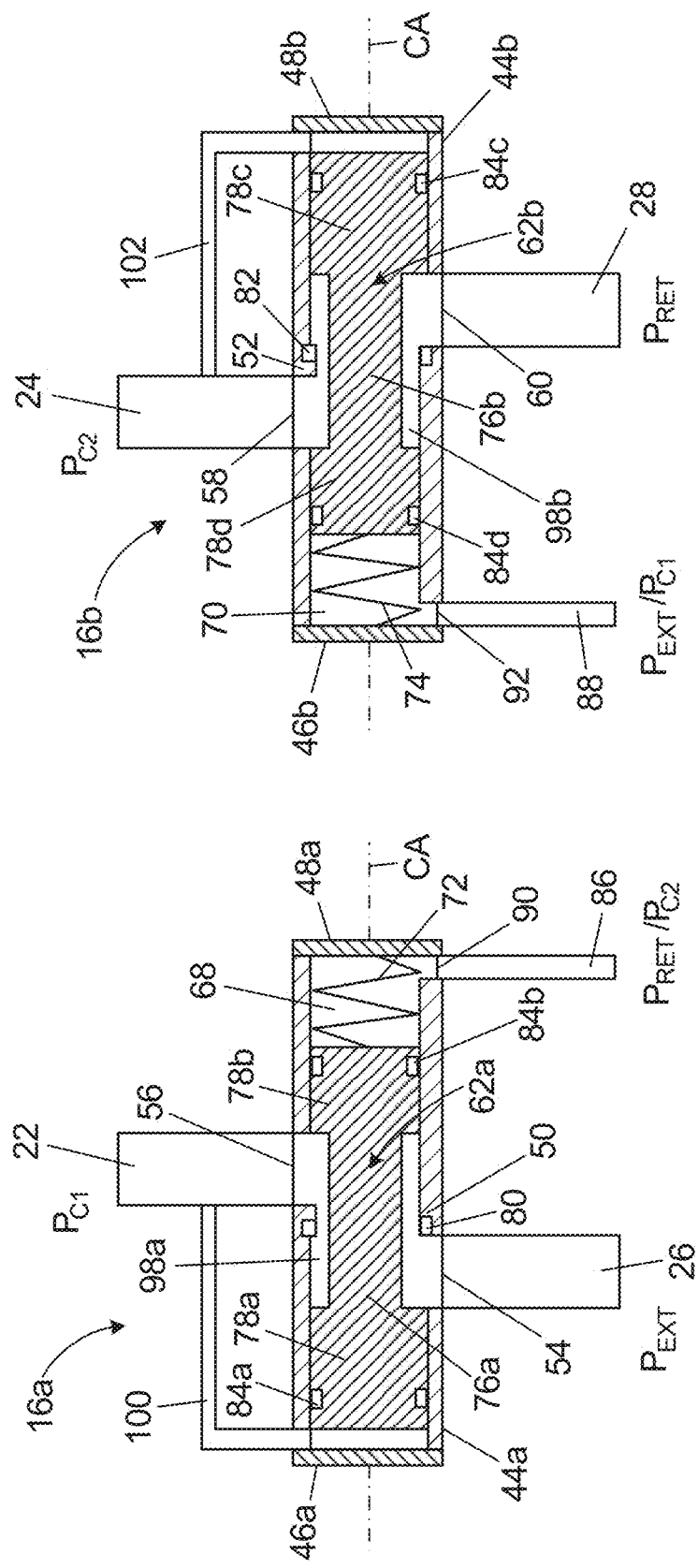
FIG. 8 is a cross-sectional schematic diagram of another example of the shutoff valve of FIG. 1.

FIG. 8 is a cross-sectional schematic diagram of another example where shutoff valve 16 of FIG. 1 includes first valve 16a and second valve 16b. In the example of FIG. 8, first valve 16a includes first valve housing 44a, first end 46a, second end 48a, first valve seat 50, first port 54, second port 56, fifth port 90, first spool 62a, first window 98a, first spring chamber 68, first spring 72, and first reference line 100. First spool 62a includes first shaft 76a, first land 78a, and second land 78b. First valve 16a also includes first seal 80, third seal 84a, and fourth seal 84b. Second valve 16b includes second valve housing 44b, first end 46b, second end 48b, second valve seat 52, third port 58, fourth port 60, sixth port 92, second spool 62b, second window 98b, second spring chamber 70, second spring 74, and second reference line 102. Second spool 62b includes second shaft 76b, third land 78c, and fourth land 78d. Second valve 16b also includes second seal 82, fifth seal 84c, and sixth seal 84d. Hydraulic actuator system 10 also includes first pressure line 86, and second pressure line 88.

First valve housing 44a extends axially from first end 46a of first valve 16a to second end 48a of first valve 16a relative to center axis CA of first valve 16a. First valve seat 50 is in first valve housing 44a and is axially between first end 46a and second end 48a of first valve 16a. First valve seat 50 is a first shelf within first valve housing 44a that extends radially inward from first valve housing 44a relative to center axis CA and that extends circumferentially around center axis CA of first valve 16a. In the example of FIG. 8, first valve seat 50 faces axially toward first end 46a of first valve 16a.

First port 54 extends through first valve housing 44a to access an interior of first valve housing 44a and is axially between first end 46a of first valve 16a and first valve seat 50. First port 54 can be fluidically connected to extend chamber 34 of actuator 12 by extend line 26. Second port 56 extends through first valve housing 44a to access the interior of first valve housing 44a and is axially between first valve seat 50 and second end 48a of first valve 16a. In the example of FIG. 8, second port 56 is fluidically connected to first control port 40 by first control line 22. Fifth port 90 extends through first valve housing 44a to access an interior of first valve housing 44a and is axially between second port 56 and second end 48a of first valve 16a. In the example of FIG. 8, fifth port 90 is fluidically connected to first pressure line 86. First pressure line 86 is fluidically connected to second control line 24 and/or second control port 42 of controller 14.

Second valve housing 44b extends axially from first end 46b of second valve 16b to second end 48b of second valve 16b relative to center axis CA of second valve 16b. While second valve housing 44b and first valve housing 44a appear to be axially aligned in FIG. 8 on a common axis, in practice first valve housing 44a and second valve housing 44b can be misaligned from one another. Second valve seat 52 is within second valve housing 44b axially between first end 46b and second end 48b of second valve 16b. Second valve seat 52 is a second shelf that extends radially inward from second valve housing 44b relative to center axis CA of second valve 16b and that extends circumferentially around center axis CA. In the example of FIG. 8, second valve seat 52 faces axially toward second end 48b of second valve 16b.

Sixth port 92 extends through second valve housing 44b to access an interior of second valve housing 44b and is axially between first end 46b of second valve 16b and second valve seat 52. In the example of FIG. 8, sixth port 92 is fluidically connected to second pressure line 88. Second pressure line 88 is fluidically connected to first control line 22 and/or first control port 40 of controller 14. Third port 58 extends through second valve housing 44b to access the interior of second valve housing 44b and is axially between sixth port 92 and second valve seat 52. In the example of FIG. 8, third port 58 is fluidically connected to second control port 42 of controller 14 by second control line 24. Fourth port 60 extends through second valve housing 44b to fluidically access the interior of second valve housing 44b and is axially between second valve seat 52 and second end 48b of second valve 16b relative to center axis CA. In the example of FIG. 4, fourth port 60 is fluidically connected to retract chamber 36 of actuator 12 by retract line 28.

First spool 62a is inside first valve housing 44a with first shaft 76a of first spool 62a extending axially between first end 46a and second end 48a of first valve 16a. First land 78a is connected to first shaft 76a and is larger in diameter than first shaft 76a relative to center axis CA of first valve 16a. In the example of FIG. 8, first land 78a is in first valve housing 44a and is axially between first valve seat 50 and first end 46a of first valve 16a. Second land 78b is connected to first shaft 76a opposite first land 78a. Second land 78b is positioned axially between second port 56 and second end 48a of first valve 16a. Second land 78b is larger in diameter than first shaft 76a and forms a first spring seat for first spring 72. Second land 78b is axially spaced from first land 78a to form first window 98a. In the example of FIG. 8, second port 56 fluidically connects with first window 98a, and first port 54 fluidically connects with first window 98a when first land 78a is in the equilibrium position of first valve 16a. In the example of FIG. 8, first spool 62a is in the equilibrium position within first valve housing 44a when first land 78a is axially between first end 46a and first port 54.

First spring chamber 68 can be formed in first valve housing 44a axially between second land 78b and second end 48a. First spring 72 can be in first spring chamber 68 between second land 78b and second end 48a of first valve 16a. First spring 72 biases first spool 62a such that first land 78a defaults to the equilibrium position between first end 46a and first port 54. First reference line 100 is a fluid line that fluidically connects first spring chamber 68 to extend line 26 such that first spring chamber 68 and extend line 26 are at the same pressure during operation of hydraulic actuator system 10 (shown in FIG. 1). By fluidically connecting first spring chamber 68 and extend line 26, the pressures in first spring chamber 68 can be used to help drive first spool 62a while also limiting a slew rate of second spool 62a at high pressures.

Second spool 62b is inside second valve housing 44b with second shaft 76b of second spool 62b extending axially between first end 46b and second end 48b of second valve 16b. Third land 78c is connected to second shaft 76b and is larger in diameter than second shaft 76b relative to center axis CA of second valve 16b. In the example of FIG. 8, third land 78c is in second valve housing 44b and is axially between second valve seat 52 and second end 48b of second valve 16b. Fourth land 78d is connected to second shaft 76b opposite third land 78c. Fourth land 78d is positioned axially between first end 46b of second valve 16b and third port 58. Fourth land 78d is larger in diameter than second shaft 76b and forms a second spring seat for second spring 74. Fourth land 78d is spaced axially from third land 78c to form second window 98b. In the example of FIG. 8, third port 58 fluidically connects with second window 98b, and fourth port 60 fluidically connects with second window 98b when third land 78c is in the equilibrium position of second valve 16b. In the example of FIG. 8, second spool 62b is in the equilibrium position within second valve housing 44b when third land 78c is axially between fourth port 60 and second end 48b.

Second spring chamber 70 can be formed in second valve housing 44b axially between first end 46b and fourth land 78d. Second spring 74 can be in second spring chamber 70 between fourth land 78d and first end 46b of second valve 16b. Second spring 74 biases second spool 62b such that third land 78bc defaults to the equilibrium position of second valve 16b between fourth port 60 and second end 48b. Second reference line 102 is a fluid line that can fluidically connect second spring chamber 70 to retract line 28 such that second spring chamber 70 and retract line 28 are at the same pressure during operation of hydraulic actuator system 10. By fluidically connecting second spring chamber 70 and retract line 28, the pressures in second spring chamber 70 can be used to help drive second spool 62b while also limiting a slew rate of second spool 62b at high pressures.

First seal 80 can be on first valve seat 50 and extend circumferentially about center axis CA of first valve 16a. In other examples, first seal 80 can be connected to first land 78a on the side of first land 78a facing first valve seat 50 instead of being connected to first valve seat 50. Second seal 82 can be on second valve seat 52 and extend circumferentially about center axis CA of second valve 16b. In other examples, second seal 82 can be connected to third land 78c on the side of third land 78c facing second valve seat 52 instead of being connected to second valve seat 52. Third seal 84a can be on first land 78a of first spool 62a and extend circumferentially on first land 78a about center axis CA. Third seal 84 can be axially positioned on first land 78a between second port 56 and fifth port 90. Third seal 84a can be on first land 78a, fourth seal 84b can be on second land 78b, fifth seal 84c can be on third land 78c, and sixth seal 84d can be on fourth land 78d. First seal 80, second seal 82, third seal 84a, fourth seal 84b, fifth seal 84c, and sixth seal 84d can all be elastomeric seals.

When first land 78a and third land 78c are in the equilibrium position, controller 14 can send fluid from supply line 18 to extend chamber 34 of actuator 12 via first control line 22, second port 56, first window 98a, first port 54, and extend line 26. Furthermore, actuator 12 can also send fluid from extend chamber 34 to controller 14 and return line 20 via extend line 26, first port 54, first window 98a, second port 56, and first control line 22 when first land 78a and third land 78c are in the equilibrium position. When first land 78a and third land 78c are in the equilibrium position, controller 14 can also send fluid from supply line 18 to retract chamber 36 of actuator 12 via second control line 24, third port 58, second window 98b, fourth port 60, and retract line 28. Furthermore, actuator 12 can also send fluid from retract chamber 36 to controller 14 and return line 20 via retract line 28, fourth port 60, second window 98b, third port 58, and second control line 24 when first land 78a and third land 78c are in the equilibrium position.

During normal operating conditions of controller 14 and actuator 12, when the pressure $P_{c1}$ in first control line 22 and second pressure line 88 and the pressure $P_{ext}$ in extend line 26 are both generated by the supply pressure in supply line 18, and when the pressure $P_{c2}$ in second control line 24 and first pressure line 86 and the pressure $P_{ret}$ in retract line 28 are related to the return pressure in return line 20, extend chamber 34 of actuator 12 will fill with fluid while retract chamber 36 of actuator 12 will empty, thereby causing linkage arm 38 of actuator 12 to extend. Also during normal operating conditions of controller 14 and actuator 12, when the pressure $P_{c1}$ in first control line 22 and second pressure line 88 and the pressure $P_{ext}$ in extend line 26 are both related to the return pressure in return line 20, and when the pressure $P_{c2}$ in second control line 24 and first pressure line 86 and the pressure $P_{ret}$ in retract line 28 are generated from the supply pressure in supply line 18, retract chamber 36 of actuator 12 will fill with fluid while extend chamber 34 of actuator 12 will empty, thereby causing linkage arm 38 of actuator 12 to retract. During normal operation pressures of actuator 12 and controller 14, first spring 72 and second spring 74 keep first land 78a and third land 78c respectively in the equilibrium position. First spring 72 and second spring 74 can include a size and stiffness that prevents first spool 62a and second spool 62b from reacting to normal operating pressures of actuator 12.

Similar to the example of shutoff valve 16 described above with reference to FIGS. 5-6B, in the event that a flight control surface connected to linkage arm 38 binds or seizes, the pressure inside first window 98a or second window 98b will increase above the normal operating pressures of actuator 12, thereby causing first spool 62a in first valve 16a to move out of the equilibrium position and shut against first valve seat 50 to block first port 54, or causing second spool 62b in second valve 16b to move out of the equilibrium position and shut against second valve seat 52 to block fourth port 60. With first port 54 or fourth port 60 blocked, fluid flow in and out of actuator 12 is stopped, thereby preventing piston 32 and linkage arm 38 from moving. With movement of piston 32 and linkage arm 38 stopped, actuator 12 is temporarily deactivated and cannot exert excessive force on the flight control surface and any linking kinematic devices and structures, thereby preventing actuator 12 from inadvertently damaging the flight control surface or damaging any linking kinematic devices and structures between actuator 12 and the flight control surface, and also preventing actuator 12 damaging itself.

DISCUSSION OF POSSIBLE EMBODIMENTS

The following are non-exclusive descriptions of possible embodiments of the present invention.

In one aspect of the disclosure, an actuation system includes an electrohydraulic servo valve with a first control port and a second control port. The system also includes a hydraulic actuator with an actuator housing, a piston inside the actuator housing, an extend chamber in the actuator housing on a first side of the piston, a retract chamber in the actuator housing on a second side of the piston, and a linkage arm extending from the piston through the actuator housing. The system also includes a shutoff valve. The shutoff valve includes a valve housing extending axially from a first end of the shutoff valve to a second end of the shutoff valve relative to a center axis of the shutoff valve. A first valve seat is formed in the valve housing and is axially between the first end and the second end of the shutoff valve. A first port extends through the valve housing and is axially between the first end of the shutoff valve and the first valve seat. The first port is fluidically connected to the extend chamber of the hydraulic actuator. A second port extends through the valve housing and is axially between the first valve seat and the second end of the shutoff valve. The second port is fluidically connected to the first control port. A third port extends through the valve housing and is axially between the second port and the second end of the shutoff valve. The third port is fluidically connected to the second control port or the retract chamber of the hydraulic actuator. A spool is inside the valve housing and includes a land in the valve housing that is axially between the first valve seat and the second end of the shutoff valve. A first spring is between the spool and the valve housing. The first spring biases the land to an equilibrium position between the second port and the third port.

The actuation system of the preceding paragraph can optionally include, additionally and/or alternatively, any one or more of the following features, configurations and/or additional components in the paragraphs below.

In an embodiment of the actuation system, the shutoff valve further comprises: a second valve seat axially between the third port and the second end of the shutoff valve, wherein the third port is fluidically connected to the second control port; and a fourth port extending through the valve housing and axially between the second valve seat and the second end of the shutoff valve, wherein the fourth port is fluidically connected to the retract chamber of the hydraulic actuator.

In an embodiment of the actuation system, the shutoff valve further comprises: a second spring within the valve housing and axially between the spool and the second end of the shutoff valve, wherein the first spring is within the valve housing and axially between the spool and the first end of the shutoff valve, and wherein the first spring and the second spring together bias the land to the equilibrium position between the second port and the third port.

In an embodiment of the actuation system, the shutoff valve further comprises: a first elastomeric seal on the first valve seat and extending circumferentially about the center axis of the shutoff valve; a second elastomeric seal on the second valve seat and extending circumferentially about the center axis of the shutoff valve; and a third elastomeric seal on the land of the spool, wherein the third elastomeric seal extends circumferentially on the land about the center axis and is axially positioned between the second port and the third port.

In an embodiment of the actuation system, the shutoff valve further comprises: a first chamber within the valve housing and axially between the first end of the shutoff valve and the land, wherein the first port fluidically connects with the first chamber, and wherein the second port fluidically connects with the first chamber when the land is in the equilibrium position; and a second chamber within the valve housing and axially between the land and the second end of the shutoff valve, wherein the fourth port fluidically connects with the second chamber, and wherein the third port fluidically connects with the second chamber when the land is in the equilibrium position.

In an embodiment of the actuation system, the spool further comprises: a shaft extending axially between the first end and the second end of the shutoff valve, and wherein the land is connected to the shaft; a second land connected to the shaft and forming a first end of the spool, wherein the second land is axially between the first end of the shutoff valve and the first valve seat; a third land connected to the shaft and forming a second end of the spool, wherein the third land is axially between the second valve seat and the second end of the shutoff valve; a first window within the valve housing and axially between the second land and the land, wherein the first port fluidically connects with the first window when the land is in the equilibrium position, and wherein the second port fluidically connects with the first window; and a second window within the valve housing and axially between the land and the third land, wherein the third port fluidically connects with the second window, and wherein the fourth port fluidically connects with the second window when the land is in the equilibrium position.

In an embodiment of the actuation system, the shutoff valve further comprises: a first spring chamber within the valve housing and axially between the first end of the shutoff valve and the second land; and a second spring chamber within the valve housing and axially between the third land and the second end of the valve housing, wherein the first spring is in the first spring chamber and the second spring is within the second spring chamber.

In an embodiment of the actuation system, the shutoff valve further comprises: a first pressure port extending through the valve housing to fluidically connect with the first spring chamber, and wherein the first pressure port is fluidically connected to the first port; and a second pressure port extending through the valve housing to fluidically connect with the second spring chamber, and wherein the second pressure port is fluidically connected to the fourth port.

In an embodiment of the actuation system, the shutoff valve further comprises: a first pressure port extending through the valve housing to fluidically connect with the first spring chamber, and wherein the first pressure port is fluidically connected to the second port; and a second pressure port extending through the valve housing to fluidically connect with the second spring chamber, and wherein the second pressure port is fluidically connected to the third port.

In an embodiment of the actuation system, the actuation system further comprises a second shutoff valve comprising: a second valve housing extending axially from a first end of the second shutoff valve to a second end of the second shutoff valve relative to a center axis of the second shutoff valve; a second valve seat formed in the second valve housing and axially between the first end and the second end of the second shutoff valve; a fourth port extending through the second valve housing and axially between the first end of the second shutoff valve and the second valve seat, wherein the fourth port is fluidically connected to the first control port or to the extend chamber of the hydraulic actuator; a fifth port extending through the second valve housing and axially between the fourth port and the second valve seat, wherein the fifth port is fluidically connected to the second control port; and a sixth port extending through the second valve housing and axially between the second valve seat and the second end of the second shutoff valve, wherein the sixth port is fluidically connected to the retract chamber of the hydraulic actuator; a second spool inside the second valve housing and comprising: a second land in the second valve housing and axially between the first end of the second shutoff valve and the second valve seat; and a second spring between the second spool and the second valve housing, wherein the second spring biases the second land to a second equilibrium position between the fourth port and the fifth port.

In another aspect of the disclosure, a shutoff valve includes a valve housing extending axially from a first end of the shutoff valve to a second end of the shutoff valve relative to a center axis of the shutoff valve. A first valve seat is formed in the valve housing and is axially between the first end and the second end of the shutoff valve. A first port extends through the valve housing and is axially between the first end of the shutoff valve and the first valve seat. A second port extends through the valve housing and is axially between the first valve seat and the second end of the shutoff valve. A third port extends through the valve housing and is axially between the second port and the second end of the shutoff valve. A spool is inside the valve housing and includes a land that is axially between the first valve seat and the second end of the shutoff valve. A first spring is between the spool and the valve housing. The first spring biases the land to an equilibrium position between the second port and the third port.

The shutoff valve of the preceding paragraph can optionally include, additionally and/or alternatively, any one or more of the following features, configurations and/or additional components in the paragraphs below.

In an embodiment of the shutoff valve, the shutoff valve further comprises: a second valve seat axially between the third port and the second end of the shutoff valve; and a fourth port extending through the valve housing and axially between the second valve seat and the second end of the shutoff valve.

In an embodiment of the shutoff valve, the shutoff valve further comprises: a second spring within the valve housing and axially between the spool and the second end of the shutoff valve, wherein the first spring is within the valve housing and axially between the spool and the first end of the shutoff valve, and wherein the first spring and the second spring together bias the land to the equilibrium position between the second port and the third port.

In an embodiment of the shutoff valve, the shutoff valve further comprises: a first elastomeric seal on the first valve seat and extending circumferentially about the center axis of the shutoff valve; a second elastomeric seal on the second valve seat and extending circumferentially about the center axis of the shutoff valve; and a third elastomeric seal on the land of the spool, wherein the third elastomeric seal extends circumferentially on the land about the center axis and is axially positioned between the second port and the third port.

In an embodiment of the shutoff valve, the shutoff valve further comprises: a first chamber within the valve housing and axially between the first end of the shutoff valve and the land, wherein the first port fluidically connects with the first chamber, and wherein the second port fluidically connects with the first chamber when the land is in the equilibrium position; and a second chamber within the valve housing and axially between the land and the second end of the shutoff valve, wherein the fourth port fluidically connects with the second chamber, and wherein the third port fluidically connects with the second chamber when the land is in the equilibrium position.

In an embodiment of the shutoff valve, the spool further comprises: a shaft extending axially between the first end and the second end of the shutoff valve, and wherein the land is connected to the shaft; a second land connected to the shaft and forming a first end of the spool, wherein the second land is axially between the first end of the shutoff valve and the first valve seat; a third land connected to the shaft and forming a second end of the spool, wherein the third land is axially between the second valve seat and the second end of the shutoff valve; a first window within the valve housing and axially between the second land and the land, wherein the first port fluidically connects with the first window when the land is in the equilibrium position, and wherein the second port fluidically connects with the first window; and a second window within the valve housing and axially between the land and the third land, wherein the third port fluidically connects with the second window, and wherein the fourth port fluidically connects with the second window when the land is in the equilibrium position.

In an embodiment of the shutoff valve, the shutoff valve further comprises: a first spring chamber within the valve housing and axially between the first end of the shutoff valve and the second land; and a second spring chamber within the valve housing and axially between the third land and the second end of the valve housing, wherein the first spring is in the first spring chamber and the second spring is within the second spring chamber.

In an embodiment of the shutoff valve, the shutoff valve further comprises: a first pressure port extending through the valve housing to fluidically connect with the first spring chamber, and wherein the first pressure port is fluidically connected to the first port; and a second pressure port extending through the valve housing to fluidically connect with the second spring chamber, and wherein the second pressure port is fluidically connected to the fourth port.

In an embodiment of the shutoff valve, the shutoff valve further comprises: a first pressure port extending through the valve housing to fluidically connect with the first spring chamber, and wherein the first pressure port is fluidically connected to the second port; and a second pressure port extending through the valve housing to fluidically connect with the second spring chamber, and wherein the second pressure port is fluidically connected to the third port.

In another aspect of the disclosure an actuation system includes an electrohydraulic servo valve, a hydraulic actuator, and a shutoff valve. The electrohydraulic servo valve includes a first control port and a second control port. The hydraulic actuator includes an actuator housing and a piston inside the actuator housing. An extend chamber is in the actuator housing on a first side of the piston. A retract chamber is in the actuator housing on a second side of the piston. A linkage arm extends from the piston through the actuator housing. A shutoff valve fluidically connects the first control port to the extend chamber and/or fluidically connects the second control port to the retract chamber. The shutoff valve includes a valve housing and a spool in the valve housing. At least one spring biases the spool to an equilibrium position that permits fluid and pressure transfer between the electrohydraulic servo valve and the hydraulic actuator. The shutoff valve also includes a valve seat that contacts the spool to close fluid and pressure transfer between the electrohydraulic servo valve and the hydraulic actuator when the spool moves out of the equilibrium position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuation system comprising:
an electrohydraulic servo valve comprising:
a first control port; and
a second control port;
a hydraulic actuator comprising:
an actuator housing;
a piston inside the actuator housing;
an extend chamber in the actuator housing on a first side of the piston;
a retract chamber in the actuator housing on a second side of the piston; and
a linkage arm extending from the piston through the actuator housing;
a shutoff valve comprising:
a valve housing extending axially from a first end of the shutoff valve to a second end of the shutoff valve relative to a center axis of the shutoff valve;
a first valve seat formed in the valve housing and axially between the first end and the second end of the shutoff valve;
a first port extending through the valve housing and axially between the first end of the shutoff valve and the first valve seat, wherein the first port is fluidically connected to the extend chamber of the hydraulic actuator;
a second port extending through the valve housing and axially between the first valve seat and the second end of the shutoff valve, wherein the second port is fluidically connected to the first control port; and
a third port extending through the valve housing and axially between the second port and the second end of the shutoff valve, wherein the third port is fluidically connected to the second control port or the retract chamber of the hydraulic actuator;
a spool inside the valve housing and comprising:
a land in the valve housing and axially between the first valve seat and the second end of the shutoff valve; and
a first spring between the spool and the valve housing, wherein the first spring biases the land to an equilibrium position between the second port and the third port.

2. The actuation system of claim 1, wherein the shutoff valve further comprises:
a second valve seat axially between the third port and the second end of the shutoff valve, wherein the third port is fluidically connected to the second control port; and
a fourth port extending through the valve housing and axially between the second valve seat and the second end of the shutoff valve, wherein the fourth port is fluidically connected to the retract chamber of the hydraulic actuator.

3. The actuation system of claim 2, wherein the shutoff valve further comprises:
a second spring within the valve housing and axially between the spool and the second end of the shutoff valve,
wherein the first spring is within the valve housing and axially between the spool and the first end of the shutoff valve, and
wherein the first spring and the second spring together bias the land to the equilibrium position between the second port and the third port.

4. The actuation system of claim 3, wherein the shutoff valve further comprises:
a first elastomeric seal on the first valve seat and extending circumferentially about the center axis of the shutoff valve;
a second elastomeric seal on the second valve seat and extending circumferentially about the center axis of the shutoff valve; and
a third elastomeric seal on the land of the spool, wherein the third elastomeric seal extends circumferentially on the land about the center axis and is axially positioned between the second port and the third port.

5. The actuation system of claim 4, wherein the shutoff valve further comprises:
a first chamber within the valve housing and axially between the first end of the shutoff valve and the land, wherein the first port fluidically connects with the first chamber, and wherein the second port fluidically connects with the first chamber when the land is in the equilibrium position; and
a second chamber within the valve housing and axially between the land and the second end of the shutoff valve, wherein the fourth port fluidically connects with the second chamber, and wherein the third port fluidically connects with the second chamber when the land is in the equilibrium position.

6. The actuation system of claim 4, wherein the spool further comprises:
a shaft extending axially between the first end and the second end of the shutoff valve, and wherein the land is connected to the shaft;
a second land connected to the shaft and forming a first end of the spool, wherein the second land is axially between the first end of the shutoff valve and the first valve seat;
a third land connected to the shaft and forming a second end of the spool, wherein the third land is axially between the second valve seat and the second end of the shutoff valve;
a first window within the valve housing and axially between the second land and the land, wherein the first port fluidically connects with the first window when the land is in the equilibrium position, and wherein the second port fluidically connects with the first window; and
a second window within the valve housing and axially between the land and the third land, wherein the third port fluidically connects with the second window, and wherein the fourth port fluidically connects with the second window when the land is in the equilibrium position.

7. The actuation system of claim 6, wherein the shutoff valve further comprises:
a first spring chamber within the valve housing and axially between the first end of the shutoff valve and the second land; and
a second spring chamber within the valve housing and axially between the third land and the second end of the valve housing,
wherein the first spring is in the first spring chamber and the second spring is within the second spring chamber.

8. The actuation system of claim 7, wherein the shutoff valve further comprises:

a first pressure port extending through the valve housing to fluidically connect with the first spring chamber, and wherein the first pressure port is fluidically connected to the first port; and a second pressure port extending through the valve housing to fluidically connect with the second spring chamber, and wherein the second pressure port is fluidically connected to the fourth port.

9. The actuation system of claim 7, wherein the shutoff valve further comprises:

a first pressure port extending through the valve housing to fluidically connect with the first spring chamber, and wherein the first pressure port is fluidically connected to the second port; and a second pressure port extending through the valve housing to fluidically connect with the second spring chamber, and wherein the second pressure port is fluidically connected to the third port.

10. The actuation system of claim 1, further comprising:
a second shutoff valve comprising:
a second valve housing extending axially from a first end of the second shutoff valve to a second end of the second shutoff valve relative to a center axis of the second shutoff valve;
a second valve seat formed in the second valve housing and axially between the first end and the second end of the second shutoff valve;
a fourth port extending through the second valve housing and axially between the first end of the second shutoff valve and the second valve seat, wherein the fourth port is fluidically connected to the first control port or to the extend chamber of the hydraulic actuator;
a fifth port extending through the second valve housing and axially between the fourth port and the second valve seat, wherein the fifth port is fluidically connected to the second control port; and
a sixth port extending through the second valve housing and axially between the second valve seat and the second end of the second shutoff valve, wherein the sixth port is fluidically connected to the retract chamber of the hydraulic actuator;
a second spool inside the second valve housing and comprising:
a second land in the second valve housing and axially between the first end of the second shutoff valve and the second valve seat; and
a second spring between the second spool and the second valve housing, wherein the second spring biases the second land to a second equilibrium position between the fourth port and the fifth port.

11. A shutoff valve comprising:
a valve housing extending axially from a first end of the shutoff valve to a second end of the shutoff valve relative to a center axis of the shutoff valve;
a first valve seat formed in the valve housing and axially between the first end and the second end of the shutoff valve;
a first port extending through the valve housing and axially between the first end of the shutoff valve and the first valve seat;
a second port extending through the valve housing and axially between the first valve seat and the second end of the shutoff valve; and
a third port extending through the valve housing and axially between the second port and the second end of the shutoff valve;

a spool inside the valve housing and comprising:
a land in the valve housing and axially between the first valve seat and the second end of the shutoff valve; and
a first spring between the spool and the valve housing, wherein the first spring biases the land to an equilibrium position between the second port and the third port.

12. The actuation system of claim 11, wherein the shutoff valve further comprises:
a second valve seat axially between the third port and the second end of the shutoff valve; and
a fourth port extending through the valve housing and axially between the second valve seat and the second end of the shutoff valve.

13. The shutoff valve of claim 12, wherein the shutoff valve further comprises:
a second spring within the valve housing and axially between the spool and the second end of the shutoff valve,
wherein the first spring is within the valve housing and axially between the spool and the first end of the shutoff valve, and
wherein the first spring and the second spring together bias the land to the equilibrium position between the second port and the third port.

14. The shutoff valve of claim 13, wherein the shutoff valve further comprises:
a first elastomeric seal on the first valve seat and extending circumferentially about the center axis of the shutoff valve;
a second elastomeric seal on the second valve seat and extending circumferentially about the center axis of the shutoff valve; and
a third elastomeric seal on the land of the spool, wherein the third elastomeric seal extends circumferentially on the land about the center axis and is axially positioned between the second port and the third port.

15. The shutoff valve of claim 14, wherein the shutoff valve further comprises:
a first chamber within the valve housing and axially between the first end of the shutoff valve and the land, wherein the first port fluidically connects with the first chamber, and wherein the second port fluidically connects with the first chamber when the land is in the equilibrium position; and
a second chamber within the valve housing and axially between the land and the second end of the shutoff valve, wherein the fourth port fluidically connects with the second chamber, and wherein the third port fluidically connects with the second chamber when the land is in the equilibrium position.

16. The shutoff valve of claim 14, wherein the spool further comprises:
a shaft extending axially between the first end and the second end of the shutoff valve, and wherein the land is connected to the shaft;
a second land connected to the shaft and forming a first end of the spool, wherein the second land is axially between the first end of the shutoff valve and the first valve seat;
a third land connected to the shaft and forming a second end of the spool, wherein the third land is axially between the second valve seat and the second end of the shutoff valve;
a first window within the valve housing and axially between the second land and the land, wherein the first port fluidically connects with the first window when the land is in the equilibrium position, and wherein the second port fluidically connects with the first window; and a second window within the valve housing and axially between the land and the third land, wherein the third port fluidically connects with the second window, and wherein the fourth port fluidically connects with the second window when the land is in the equilibrium position.

17. The shutoff valve of claim 16, wherein the shutoff valve further comprises:
   a first spring chamber within the valve housing and axially between the first end of the shutoff valve and the second land; and
   a second spring chamber within the valve housing and axially between the third land and the second end of the valve housing,
   wherein the first spring is in the first spring chamber and the second spring is within the second spring chamber.

18. The shutoff valve of claim 17, wherein the shutoff valve further comprises:
   a first pressure port extending through the valve housing to fluidically connect with the first spring chamber, and wherein the first pressure port is fluidically connected to the first port; and
   a second pressure port extending through the valve housing to fluidically connect with the second spring chamber, and wherein the second pressure port is fluidically connected to the fourth port.

19. The shutoff valve of claim 17, wherein the shutoff valve further comprises:
   a first pressure port extending through the valve housing to fluidically connect with the first spring chamber, and wherein the first pressure port is fluidically connected to the second port; and
   a second pressure port extending through the valve housing to fluidically connect with the second spring chamber, and wherein the second pressure port is fluidically connected to the third port.

20. An actuation system comprising:
an electrohydraulic servo valve comprising:
   a first control port; and
   a second control port;
a hydraulic actuator comprising:
   an actuator housing;
   a piston inside the actuator housing;
   an extend chamber in the actuator housing on a first side of the piston;
   a retract chamber in the actuator housing on a second side of the piston; and
   a linkage arm extending from the piston through the actuator housing;
a shutoff valve fluidically connecting the first control port to the extend chamber and/or fluidically connecting the second control port to the retract chamber, wherein the shutoff valve comprises:
   a valve housing;
   a spool in the valve housing;
   at least one spring, wherein the at least one spring biases the spool to an equilibrium position that permits fluid and pressure transfer between the electrohydraulic servo valve and the hydraulic actuator; and
   a valve seat that contacts the spool to close fluid and pressure transfer between the electrohydraulic servo valve and the hydraulic actuator when the spool moves out of the equilibrium position.

* * * * *